United States Patent
Langworthy et al.

(10) Patent No.: US 8,296,744 B2
(45) Date of Patent: Oct. 23, 2012

(54) TREE-BASED DIRECTED GRAPH PROGRAMMING STRUCTURES FOR A DECLARATIVE PROGRAMMING LANGUAGE

(75) Inventors: David E. Langworthy, Kirkland, WA (US); John L. Hamby, Seattle, WA (US); Bradford H. Lovering, Seattle, WA (US); Donald F. Box, Yarrowpoint, WA (US)

(73) Assignee: Microsoft Corporation, Redmond, WA (US)

( * ) Notice: Subject to any disclaimer, the term of this patent is extended or adjusted under 35 U.S.C. 154(b) by 1024 days.

(21) Appl. No.: 12/244,959

(22) Filed: Oct. 3, 2008

(65) Prior Publication Data

US 2010/0088665 A1      Apr. 8, 2010

(51) Int. Cl.
*G06F 9/44* (2006.01)
*G06F 9/45* (2006.01)

(52) U.S. Cl. ........ 717/143; 717/117; 717/141; 717/142; 717/144

(58) Field of Classification Search .................... None
See application file for complete search history.

(56) References Cited

U.S. PATENT DOCUMENTS

| | | | | |
|---|---|---|---|---|
| 5,742,828 A * | 4/1998 | Canady et al. | ................. | 717/144 |
| 6,061,513 A * | 5/2000 | Scandura | ..................... | 717/142 |
| 6,286,133 B1 * | 9/2001 | Hopkins | ....................... | 717/143 |
| 6,604,099 B1 | 8/2003 | Chung et al. | | |
| 6,681,221 B1 | 1/2004 | Jacobs | | |
| 6,792,414 B2 * | 9/2004 | Chaudhuri et al. | ................... | 1/1 |
| 6,820,253 B1 * | 11/2004 | Robison | ....................... | 717/141 |
| 7,089,541 B2 * | 8/2006 | Ungar | ........................... | 717/143 |
| 7,117,488 B1 * | 10/2006 | Franz et al. | ..................... | 717/144 |
| 7,124,144 B2 | 10/2006 | Christianson et al. | | |
| 7,146,606 B2 * | 12/2006 | Mitchell et al. | ................ | 717/141 |
| 7,174,536 B1 * | 2/2007 | Kothari et al. | ................ | 717/109 |
| 7,254,808 B2 * | 8/2007 | Trappen et al. | ................ | 717/143 |
| 7,401,071 B2 | 7/2008 | Hattori et al. | | |
| 7,716,655 B2 * | 5/2010 | Uchida | ......................... | 717/140 |
| 7,966,610 B2 * | 6/2011 | Lin | ................................. | 717/153 |
| 2002/0059566 A1 | 5/2002 | Delcambre et al. | | |
| 2003/0078915 A1 * | 4/2003 | Chaudhuri et al. | ............... | 707/3 |
| 2004/0083454 A1 * | 4/2004 | Bigus et al. | .................... | 717/117 |
| 2004/0268325 A1 | 12/2004 | Moore et al. | | |
| 2006/0064432 A1 | 3/2006 | Pettovello | | |
| 2006/0195828 A1 * | 8/2006 | Nishi et al. | ..................... | 717/140 |
| 2006/0230378 A1 * | 10/2006 | Waddington et al. | .......... | 717/100 |
| 2006/0265695 A1 * | 11/2006 | Arai | ............................... | 717/127 |
| 2007/0006191 A1 * | 1/2007 | Franz et al. | ..................... | 717/146 |

(Continued)

OTHER PUBLICATIONS

Andrea Schaerf, "Alma-0: An Imperative Language that Supports Declarative Programming", ACM Sep. 1998, pp. 1014-1066, <http://dl.acm.org/citation.cfm?id=293679>.*

(Continued)

*Primary Examiner* — Thuy Dao
*Assistant Examiner* — Cuong V Luu
(74) *Attorney, Agent, or Firm* — Chin IP, PLLC; Davin Chin

(57) ABSTRACT

Embodiments of tree-based directed graph programming structures for a declarative programming language are provided. In various embodiments, complex graph structured data, referred to as "DGraphs" herein in one non-limiting implementation, is authored using a compact, human friendly syntax without the use of explicit identifiers. In one non-limiting aspect, the syntax includes support for conformance relationships, also referred to as factored relationships. In another non-limiting aspect, the semistructured graph data is a tree-based representation and the syntax includes lexical resolution of references or lexical scoping, and/or non local initialization.

19 Claims, 25 Drawing Sheets

U.S. PATENT DOCUMENTS

2007/0067759 A1* 3/2007 Uchida ............ 717/140
2007/0169039 A1* 7/2007 Lin ............ 717/146

OTHER PUBLICATIONS

Laks V.S. Lakshmanan, "A Declarative Language for Querying and Restructuring the Web", 1996 IEEE, pp. 12-21, <http://ieeexplore.ieee.org/xpls/abs_all.jsp?arnumber=492238&tag=1>.*

J. W. Lloyd, "Declarative Programming in Escher", University of Bristol, UK, Jun. 1995, 128 pages, <http://www.cs.bris.ac.uk/Publications/Papers/1000073.pdf>.*

Roger F. Crew, "ASTLOG: A Language for Examining Abstract Syntax Trees", 1997—usenix.org, 15 pages, <http://static.usenix.org/publications/library/proceedings/ds197/full_papers/crew/crew.pdf>.*

B. G. Batchelor, "A Deciarative Language for Robot Vision", Computer Vision & Robot Control, Cambndge MA, Nov. 1988, 4 pages, <http://ieeexplore.ieee.org/stamp/stamp.jsp?tp=&arnumber=197754>.*

Martin Bravenboer, "Concrete Syntax for Objects", 2004 ACM, pp. 365-383, <http://dl.acm.org/citation.cfm?id=1029007>.*

International Search Report mailed Apr. 27, 2010 for PCT Application No. PCT/US2009/059112, 2 pages.

Syme, Don; "An Alternative Approach to Initializing Mutually Referential Objects"; Retrieved at <<http://research.microsoft.com/~dsyme/papers/valrec-tr.pdf>>; Mar. 10, 2005; Microsoft Corporation, Redmond, US; 29 pages.

Cicchetti, et al.; "A Metamodel Independent Approach to Difference Representation"; Retrieved at <<http://www.jot.fm/issues/issue_2007_10/paper9.pdf>>: Journal of Object Technology, 2007, vol. 6—No. 9; ETH Zurich, Zurich, CH; 21 pages.

Chatterjee, et al.: "The Alignment-Distribution Graph"; Retrived at <<http://ntrs.nasa.gov/archive/nasa/casi.ntrs.nasa.gov/19940011483_1994011483.pdf>>; RIACS Technical Report, Aug. 1993; NASA Ames Research Center, Moffett Field, USA; 22 pages.

Chambers, et al.; "The Cecil Language Specification and Rationale Version 3.2"; Retrieved at <<www.cs.washington.edu/research/projects/cecil/www/Release/doc-cecil-lang/cecil-spec.ps>>; Feb. 2004; University of Washington, Seattle, US; 105 pages.

"Invitation pursuant to Rule 62a(1) EPC and Rule 63(1) EPC", and the claims discussed therein; Invitation dated: Jul. 19, 2012; European Pat. App. No. 09818475.7 (MS# 324879.03); Filed: Apr. 1, 2011; 7 Pages.

* cited by examiner

| ORDER | BAR VALUE |
|---|---|
| 1 | A |
| 2 | B |
| 3 | C |

| ID | BAR VALUE |
|---|---|
| XXX | A |
| YYY | B |
| ZZZ | C |

TREE-BASED DIRECTED GRAPH PROGRAMMING STRUCTURES FOR A DECLARATIVE PROGRAMMING LANGUAGE

TECHNICAL FIELD

The subject disclosure generally relates to tree-based directed graph programming structures for a declarative programming language.

BACKGROUND

By way of general background, in computer science, an abstract syntax tree (AST) is a tree representation of the syntax of some source code that has been written in a programming language, or some other functional equivalent representation of the source code. Each node of the tree denotes a construct occurring in the source code. The tree is abstract in that the tree may not represent some constructs that appear in the original source. An example of such an omission is grouping parentheses, since, in an AST, the grouping of operands is implicit in the tree structure.

An AST is often built by a parser as part of the process of compiling source code. Once built, additional information is added to the AST by subsequent processing, e.g., semantic analysis, which can result in the production of an abstract semantic graph (ASG) based on an AST. An ASG is a higher level abstraction than an AST, which is used to express the syntactic structure of an expression or program. In computer science, an ASG is a data structure used in representing or deriving the semantics of an expression in a formal language, for example, a programming language.

An ASG is typically constructed from an abstract syntax tree by a process of enrichment and abstraction. For example, enrichment can be the addition of back-pointers or edges from an identifier node where a variable is being used to a node representing the declaration of that variable. Abstraction, for example, can entail the removal of details, which are relevant only in parsing, not for semantics.

In this regard, current representations for semistructured data such as XML are limited to representing tree structures. With XML, representing graph structures requires using explicit references, such as XML_ID, which introduce complexity and lacks flexibility with respect to representation and storage of the underlying graph structures. For instance, use of XML ID requires that the type system define what an identifier is and what a reference is, which means such definitions are external to the underlying graph structures introducing difficulty of use.

Accordingly, there is an outstanding need for the ability to author complex graph structured data using a compact, human friendly syntax without the use of explicit identifiers. The above-described deficiencies of current representations of semistructured program data as graphs are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Embodiments of tree-based directed graph programming structures for a declarative programming language are provided. In various embodiments, complex graph structured data, referred to as "DGraphs" herein in one non-limiting implementation, is authored using a compact, human friendly syntax without the use of explicit identifiers. In one non-limiting aspect, the syntax includes support for conformance relationships, also referred to as factored relationships. In another non-limiting aspect, the semistructured graph data is a tree-based representation and the syntax includes lexical resolution of references or lexical scoping and/or non local initialization.

These and other embodiments are described in more detail below.

BRIEF DESCRIPTION OF THE DRAWINGS

Various non-limiting embodiments are further described with reference to the accompanying drawings in which:

FIG. 22 is an illustration of data storage according to an ordered execution model;

FIG. 23 is a non-limiting illustration of data storage according to an order-independent execution model;

DETAILED DESCRIPTION OVERVIEW

Figure 1:
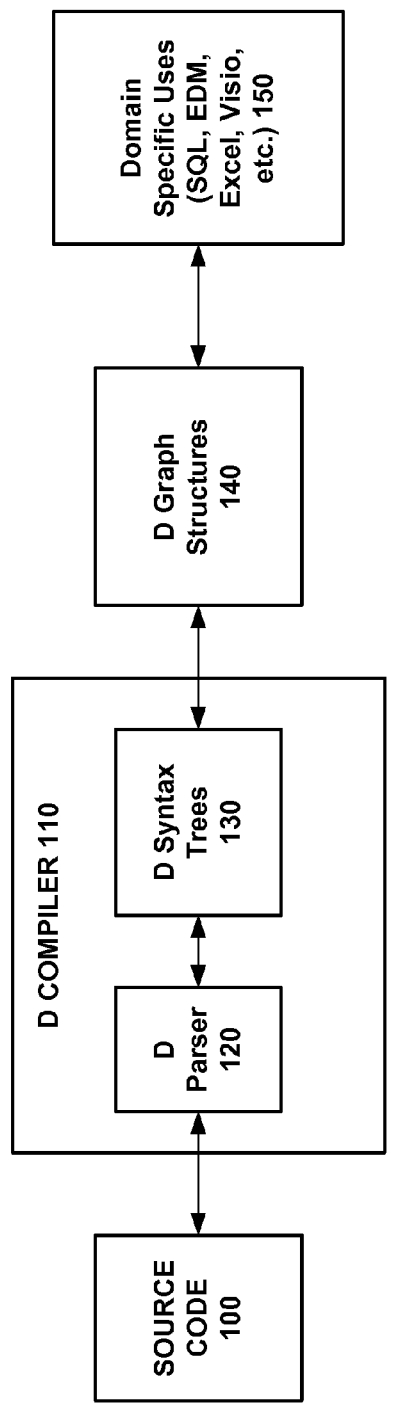
FIG. 1 is a block diagram of a compiling process chain for a declarative programming language and related structures.

As discussed in the background, among other things, conventional systems do not allow authoring of complex graph structured data using a compact, human friendly syntax. Where complex graph structured data is represented with XML, the representation must use explicit identifiers or references like XML_ID to form the structured graph data.

Accordingly, in various non-limiting embodiments, embodiments are provided for tree-based directed graph programming structures for a declarative programming language. Complex graph structured data, referred to as "DGraphs" herein in some embodiments, can be authored using a compact, human friendly syntax without the use of explicit identifiers. In various non-limiting aspects, the syntax includes support for conformance relationships, enables lexical resolution of references (a.k.a. lexical scoping) and/or non local initialization.

As a roadmap for what follows, an overview of various embodiments is first provided and then exemplary, non-limiting optional implementations and example graphs and graph representations are discussed in more detail for additional understanding. Next, some supplemental context is provided in connection with declarative programming languages, such as the D programming language. Finally, some exemplary non-limiting network and computing environments in which the techniques described herein can be deployed are set forth.

In general, it is often desirable to author source code in a declarative programming language, often considered the counterpart to imperative programming languages. Unlike imperative programming languages, declarative programming languages allow users to write down what they want from their data without having to specify how those desires are met against a given technology or platform. In this regard, the D programming language (or "D" for short), more details about which can be found below, is a declarative programming language that is well suited to compact and human understandable representation and advantageously includes efficient constructs for creating and modifying data intensive applications, independent of an underlying storage mechanism, whether flash storage, a relational database, RAM, external drive, network drive, etc. "D" is also sometimes called the "M" programming language, although for consistency, references to M are not used herein.

D includes an efficient and compact syntax for writing declarative source code. In this regard, the programming constructs of D can also be represented efficiently as semistructured graph data based on one or more abstract syntax trees generated for a given source code received by a compiler. In addition, due to the human friendly nature of the syntax for the semistructured graph data, applications and developers are not required to form actual source code when the semistructured graph data can be specified directly. In this regard, based on a set of trees, or another specification of a D program, a DGraph can be formed that efficiently represents the programming constructs of the D program due to various novel properties supported in the syntax that contribute to the formation of simpler DGraph structures that are understandable to machines, and also humans based upon visual inspection of a textual representation of DGraph structures that is not abstruse, like conventional textual representations of semantic graphs.

A general block diagram system illustrating different ways that D programs can be represented and used is shown in the compilation chain of FIG. 1. For instance, source code 100 can be authored directly by developers, or machines. Source code 100 can be compiled by a D compiler 110 including, for instance, a D parser 120 for parsing source code 100 and a D Syntax Tree component 130 for forming D Syntax Trees, which can then be analyzed and transformed to D Graph structures 140. D Graph structures 140 can be generated by developers directly, and also by applications, and represented in a compact manner based on some features supported by D Graph structures. D Graph structures 140 can be unwound to trees 130 and back to source code 100, and D Graph structures 140 can be compiled or semi-compiled to object code in connection with data intensive applications according to various domain specific uses 150, such as SQL database queries, enterprise data management (EDM), spreadsheet applications, graphics applications, i.e., anywhere that data can be stored and analyzed.

In this regard, two features of D Graph structures 140 that have not previously been realized include support for conformance relation and lexical resolution of identifiers or references.

Figure 2:
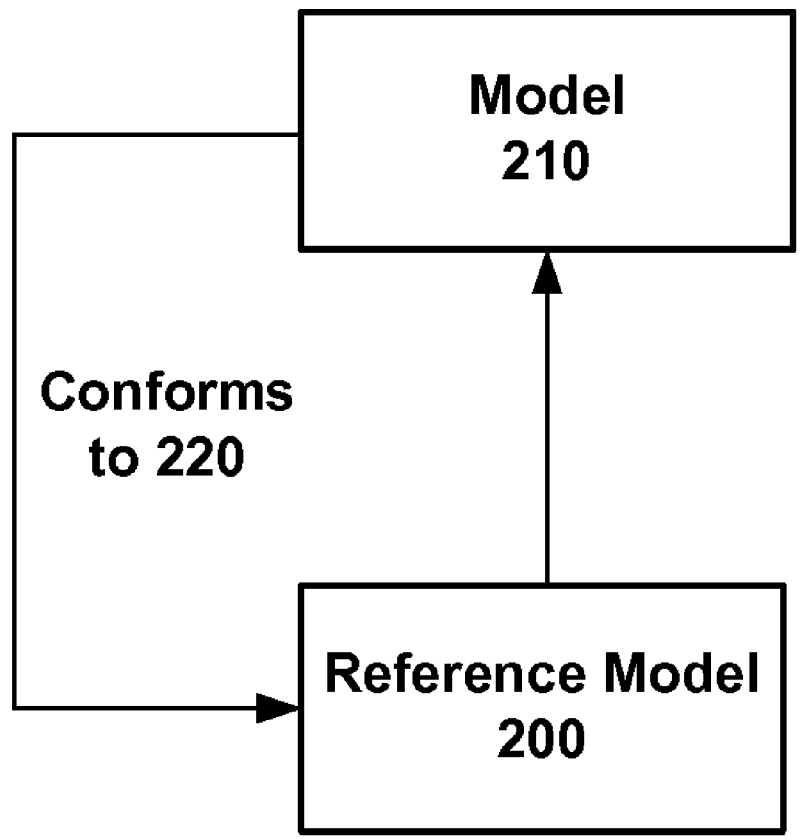
FIG. 2 is a general illustration of a conformance relation.

Generally speaking, as shown in FIG. 2, the conformance relation 220 links one model 210 to another model called its reference model 200. More specifically, conformance relation 220 in the context of a declarative programming model as described herein refers to the possibility of identifying factored definitions for common labels, and to join them for efficient representation of directed graph structures.

Figure 3:
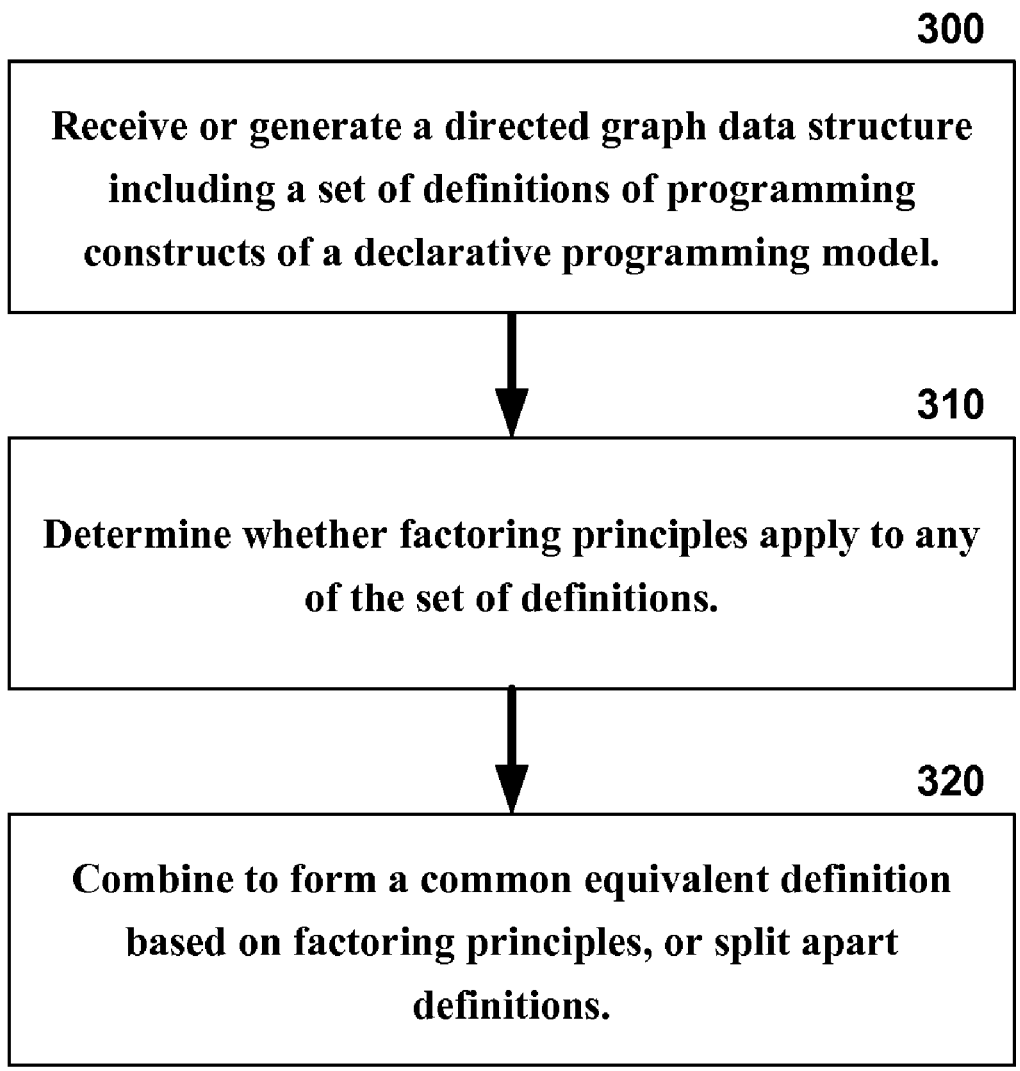
FIG. 3 is a flow diagram illustrating a first non-limiting aspect of directed graph structures.

For instance, FIG. 3 generally illustrates a method for representing programming constructs of a declarative programming model as a directed graph in one embodiment. At 300, a directed graph data structure is received including a set of definitions of programming constructs of a declarative programming model. At 310, a determination is made whether a factoring applies to any of the set of definitions. If so, then at 320, definitions can be combined to form a common equivalent definition based on factoring principles, or definitions can be split apart (factored) where convenient for storage or other reasons. The factoring can apply to a directed graph structure that is received, or retrieved from storage, or at the time a directed graph structure is generated.

Figure 4:
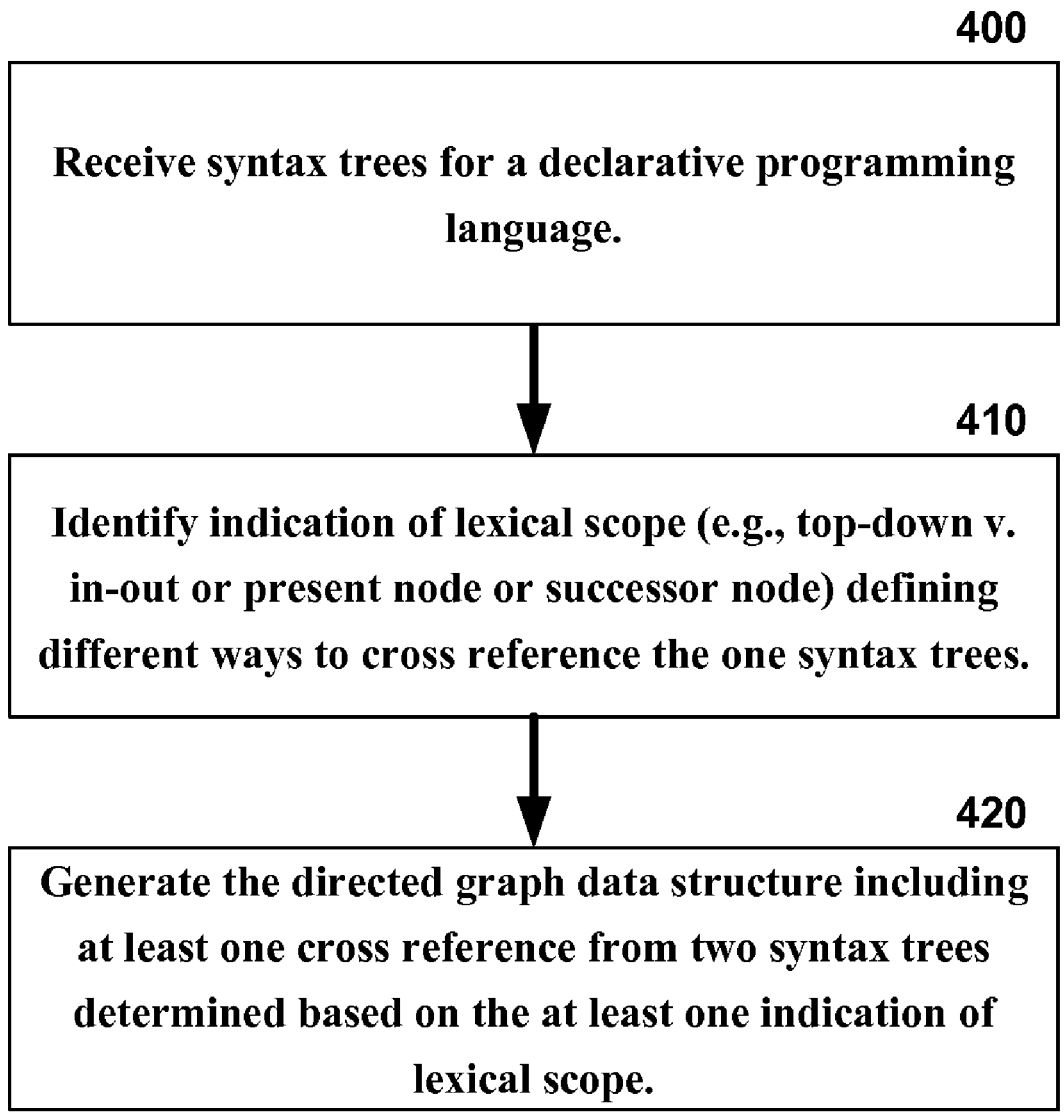
FIG. 4 is a flow diagram illustrating a second non-limiting aspect of directed graph structures.

Lexical resolution or lexical scoping, as opposed to dynamic scoping, is advantageous in connection with the D programming language in order to build flexible and arbitrary directed graphs. For instance, FIG. 4 generally illustrates a method for representing programming constructs of a declarative programming model as a directed graph based on tree representations. At 400, syntax trees for a declarative programming language are received. At 410, an indication of lexical scope defining different ways to cross reference the one syntax trees is identified and then at 420, the directed graph data structure is generated including at least one cross reference from two syntax trees determined based on the at least one indication of lexical scope. Lexical scoping includes defining whether a top-bottom level scoping applies, or whether and inside-out scoping applies, and also includes indicating whether a present node or a successor node applies to a given edge of the graph.

Figure 5:
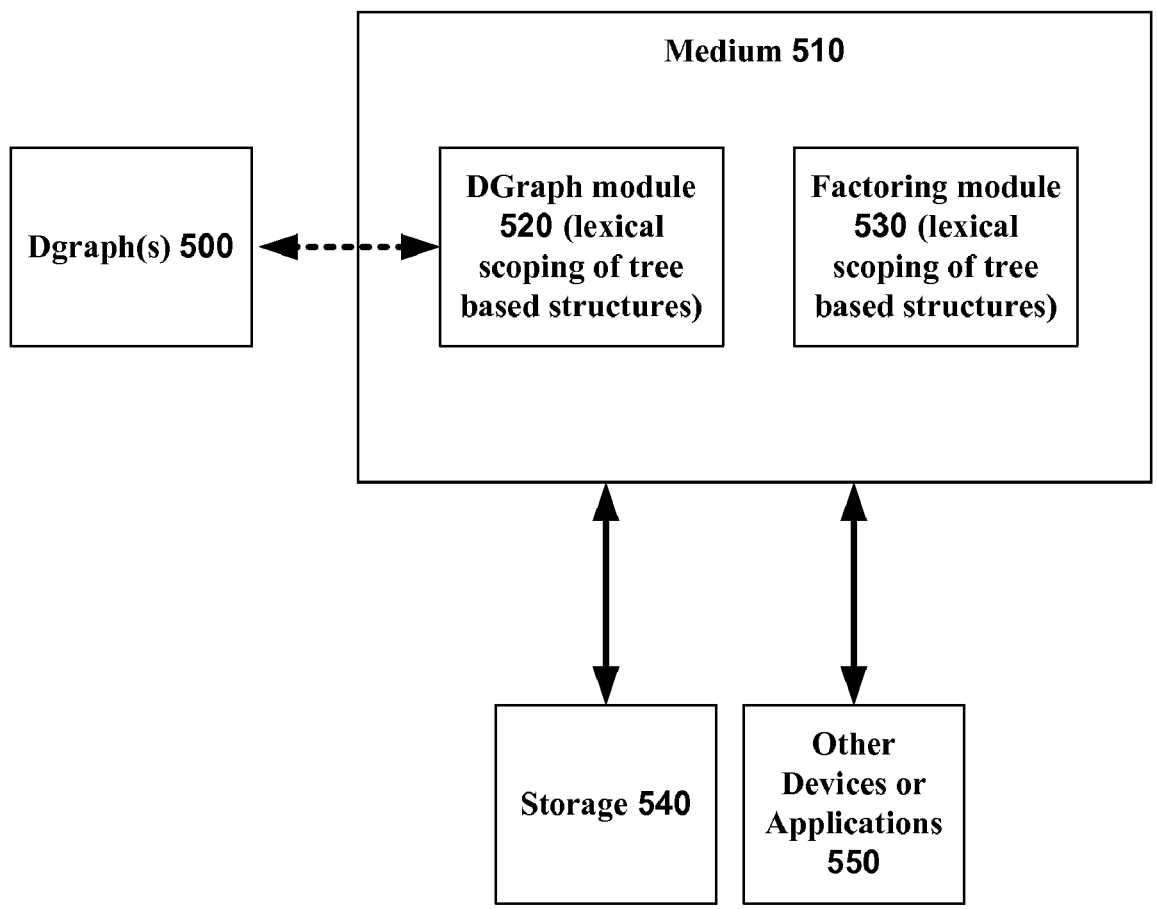
FIG. 5 is a block diagram illustrating an exemplary embodiment as a computer readable medium with computer executable modules according to one or more aspects described herein.

In one embodiment, as shown generally by FIG. 5, a computer program product 500, such as a computer readable medium, can include a DGraph module 510 for generating or receiving a directed graph data structure representing a declarative programming model. In one embodiment, the declarative programming model supports constraint based type definitions and follows an order independent execution model. As described in a first non-limiting aspect, a factoring module 520 can be included for identifying definitions of the directed graph data structure to which factoring can be applied. In a second non-limiting aspect, when generating the directed graph data structure, the DGraph module determines a lexical scope applying to the formation of the directed graph data structure.

Tree-Based Directed Graph Programming Structures

Figure 6:
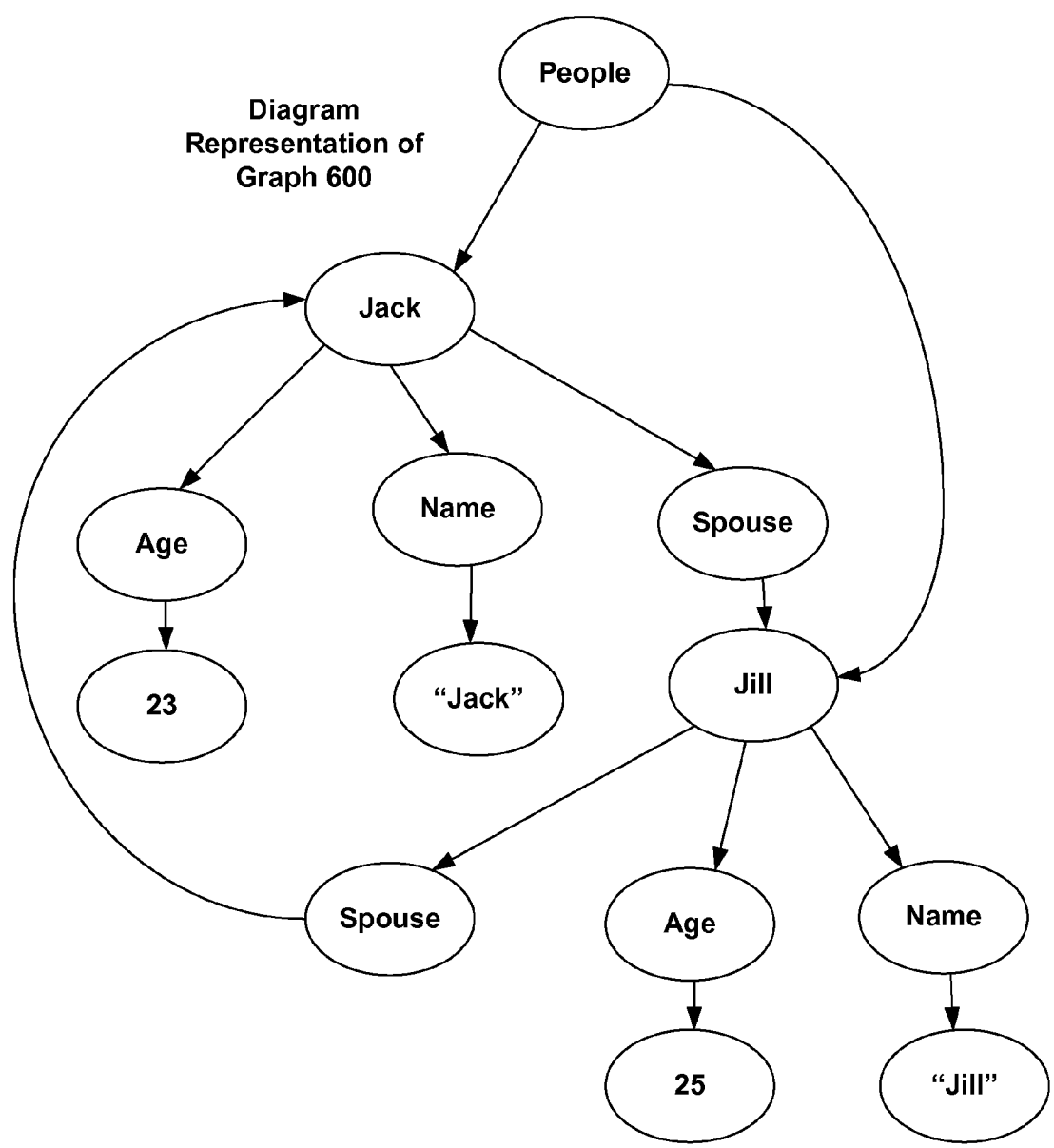
FIG. 6 is a sample diagrammatic representation of semistructured graph data for illustrative purposes.

As mentioned, in various non-limiting embodiments, tree-based directed graph programming structures are provided for a declarative programming language. For some additional background, fundamentally, a DGraph is a labeled directed graph having the following items:

1. A set N of nodes;
2. A binary relation A on N. A is called the set of arcs of the directed graph. Arcs are thus pairs of nodes;
3. A set l of labels; and
4. A binary relation L on N×l. L is referred to as the labels of the directed graph. FIG. 6 illustrates an example graph represented as a diagram 600. Using the formalism above, the diagram 600 of the graph can be represented textually as:

N={1,2,3,4,5,6,7,8,9,10,11,12,13}
A={(1,2),(1,3),(2,4),(2,5),(2,6),(3,7),(3,8),(3,9),(4,10),(5,11),(6,2),(7,1),(8,12),(9,12)}
l={People, Jack, Jill, Name, Age, Spouse, "Jack", 23, "Jill", 25}
L={(People,1),(Jack,2),(Jill,3),(Name,4),(Age,5),(Spouse,6),(Spouse,7), (Name,8),(Age,9),("Jack",10),(23,11),("Jill",12),(25,13)}

While precise and sufficient to represent all graphs, this textual form leaves a lot to be desired:

1. The structure of the graph is not clear as it is in the diagram.
2. The syntax does not guarantee a well formed graph e.g., (1,14) is valid syntax, but not a valid edge since 14 is not a node.
3. The text has information that does not matter to the graph that the author has to make up, specifically the node and label ids.

Further,

4. Authoring large graphs is facilitated by factoring the description into separate components that can be composed.

Consider the following textual representation of the same graph:

```
People {
    Jack {
        Name = "Jack",
        Age = 23,
        Spouse = &Jill
    },
    Jill {
        Name = "Jill",
        Age = 25,
        Spouse = &Jack
    }
}
```

Even without further explanation, one can visually observe the compactness and clear definition of the structure of the graph in this form. In this regard, the syntax of a D graph is explained in further detail and with reference to the following generalized syntax.

```
DGraph:
    Empty
    { DGraph }
    DGraph , DNode
DNode:
    Literal
    Reference
    Identifier = DNode
    Identifier { DGraph }
Reference:
    Path
    . Path
    & Path
    & . Path
Path:
    Identifier
    Path . Identifier
```

The syntax is based upon block structured programming to facilitate authoring graphs in the above textual form. The syntax Identifier {DGraph} has a label and a block. The Identifier represents a new node in the graph labeled with the Identifier. The block, DGraph, contains the successors of that new node. The following smaller example represents a graph with 4 nodes and 3 edges.

Colors {"Red", "Blue", "Yellow"}

Figure 7:
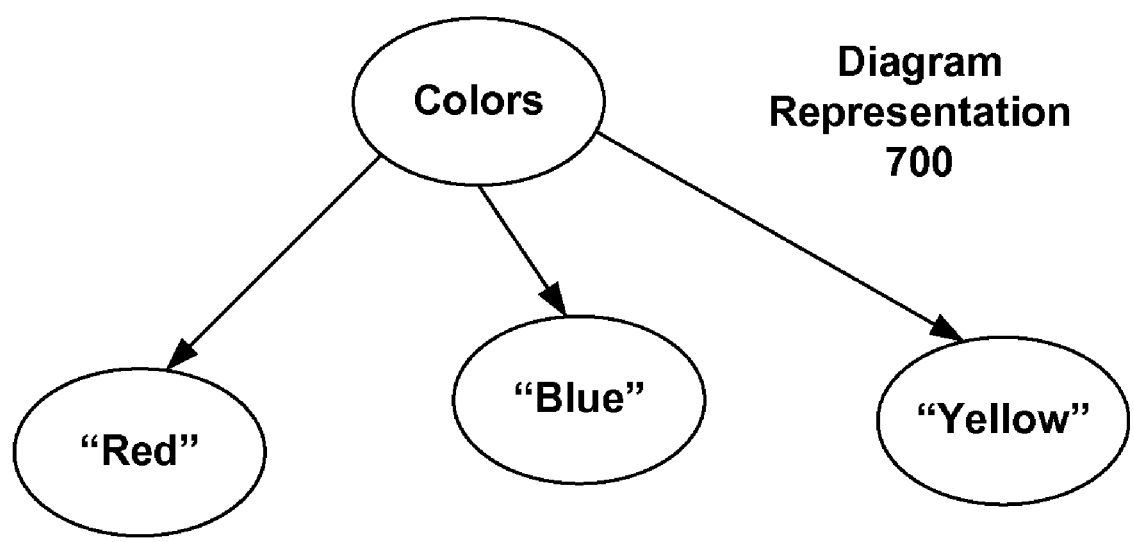
FIG. 7 is a sample diagrammatic representation of semistructured graph data for illustrative purposes.

As shown by diagram 700 of FIG. 7, the node labeled Colors has 3 edges to nodes labeled "Red", "Blue", "Yellow".

The syntax Identifier=DNode is exactly equivalent to
Identifier {DNode},
which is a node with a single successor. The following example represents a graph with 2 nodes and 1 edge.

Age=23

The node labeled Age has an edge to the node labeled 23. The following syntax represents the exact same graph.

Age {23}

References are a feature of DGraphs, without which, DGraphs would be trees much like those that can be represented with XML, JavaScript Object Notation (JSON), S-Expressions, etc. In general, DGraph references are quite rich in that references can be local or absolute, can retrieve a node (lvalue) or its successors (rvalue), and can be qualified with a path.

Figure 8:
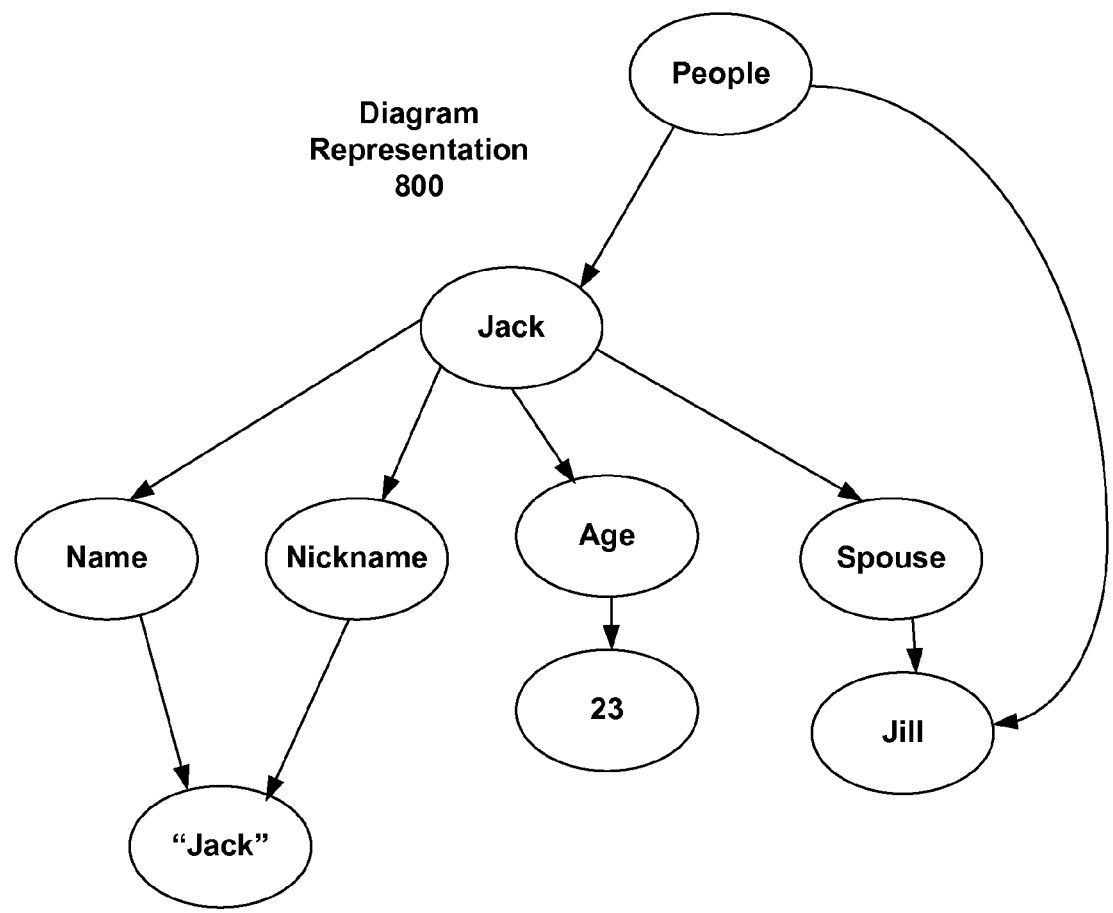
FIG. 8 is a sample diagrammatic representation of semistructured graph data for illustrative purposes.

With DGraphs, references with a leading ampersand resolve to the node or nodes to which the reference resolves. Ampersand analogizes to an lvalue in C. Without the ampersand, the reference binds to the successor or successors of the node to which the label resolves. With reference to diagram 800 of FIG. 8, the following example has two references &Jill and Name. The &Jill reference binds to the node Jill{ }. The Name reference binds to the successor of Name, "Jack".

People{Jack{Name{"Jack"}, Age{23 }, Spouse{&Jill}, Nickname=Name}, Jill{ }}

Further a reference with a leading dot (e.g., period) is absolute and matches the top level scope. A reference without a leading dot is local and matches the innermost occurrence of a label.

Figure 9:
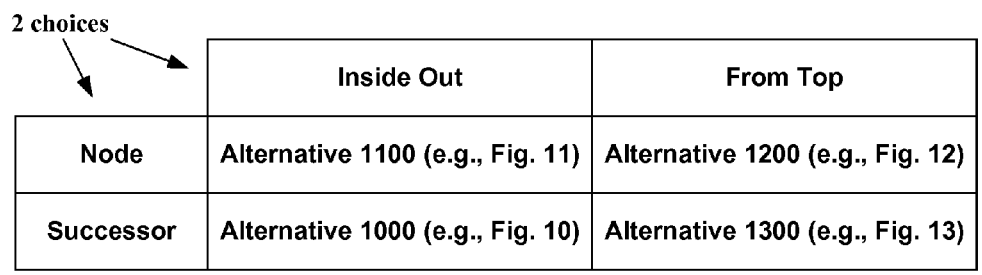
FIG. 9 illustrates exemplary aspects of lexical scoping in connection with tree based structures as described in one or more embodiments.

Composing this option with ampersand yields four alternatives summarized in FIG. 9 and illustrated individually in FIGS. 10, 11, 12 and 13. FIG. 9 illustrates that lexical scoping can be applied based on the present or successor node, and also applied to specify either inside out or top-down scoping of blocks of the declarative programming model. The quadrants are illustrated in more detail in FIGS. 10, 11, 12 and 13, whereby the resulting diagrammatic representations based on such lexical scoping choices can be compared.

Figure 10:
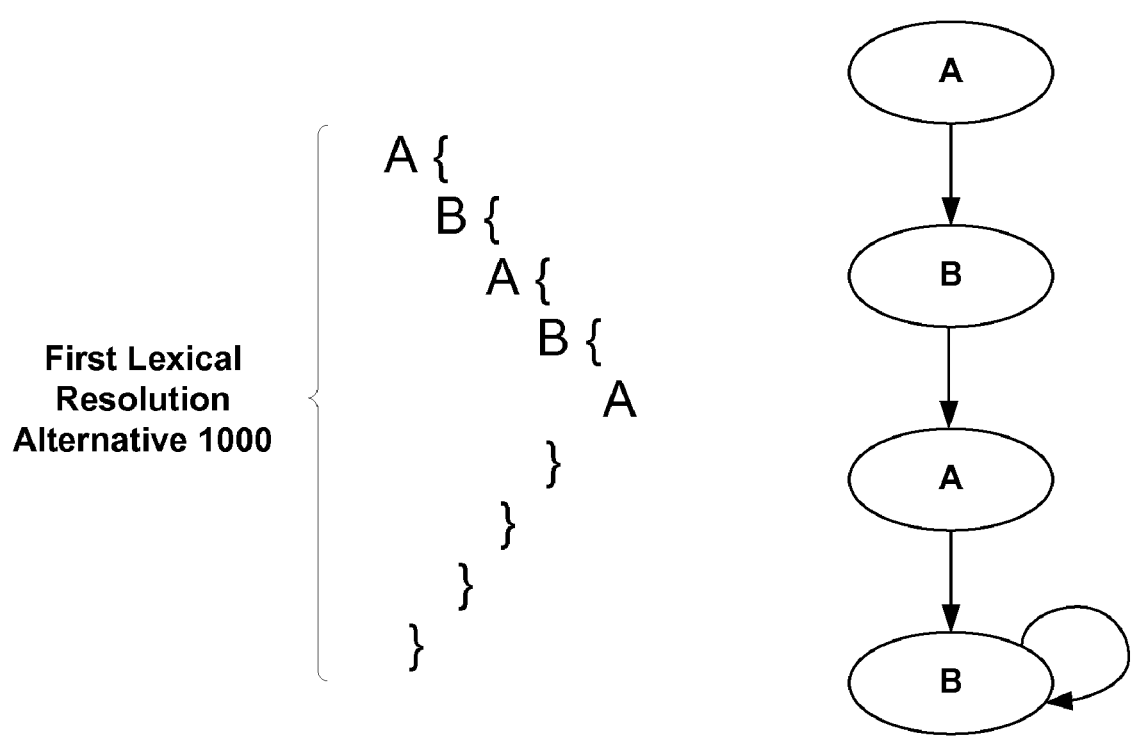
FIGS. 10, 11, 12 and 13 show a diagrammatic mapping to textual representations of different lexical scoping choices for a directed graph structure enabling a comparison of the choices.

FIG. 10 illustrates a first lexical resolution alternative 1000 in which no dot, and no ampersand appear for the center block A. As a result, the equivalent diagrammatic representation of the directed graph appears to the right.

Figure 11:
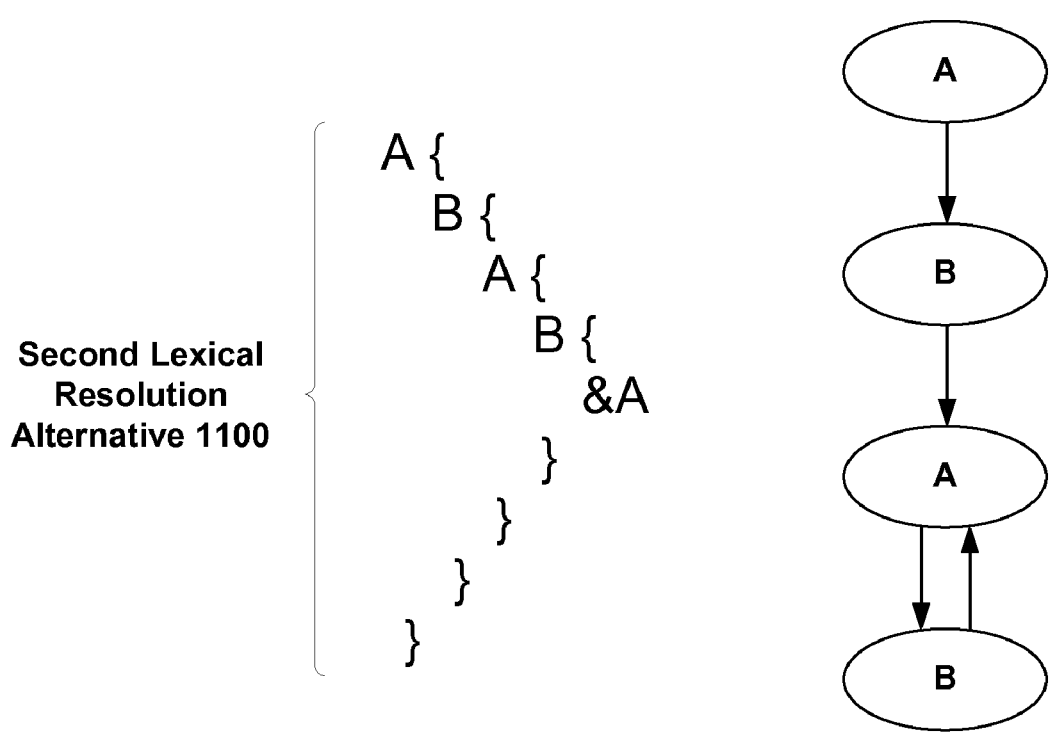

FIG. 11 illustrates a second lexical resolution alternative 1100 in which no dot, but an ampersand appears for the center block A. As a result, the equivalent diagrammatic representation of the directed graph appears to the right.

Figure 12:
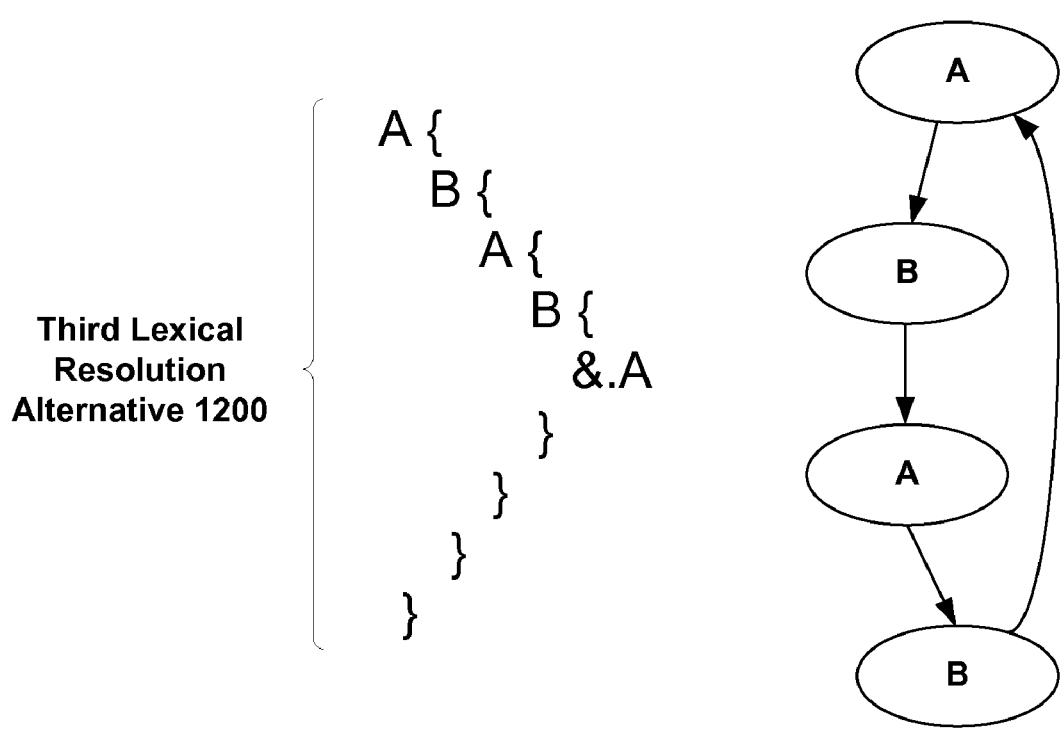

FIG. 12 illustrates a third lexical resolution alternative 1200 in which both a dot, and an ampersand appear for the center block A. As a result, the equivalent diagrammatic representation of the directed graph appears to the right.

Figure 13:
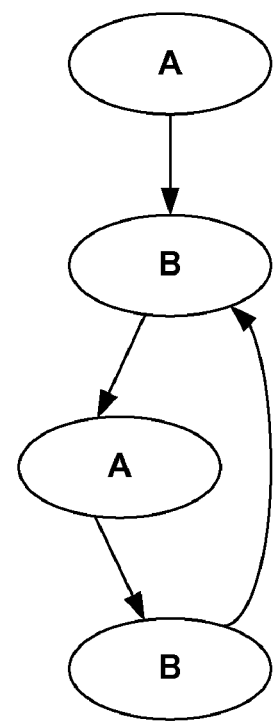

FIG. 13 illustrates a fourth lexical resolution alternative 1300 in which a dot, but no ampersand appears for the center block A. As a result, the equivalent diagrammatic representation of the directed graph appears to the right. As mentioned, the diagrammatic representations illustrate how directed graphs can be controllably and flexibly formed via lexical scoping of the blocks of the declarative programming constructs.

With respect to some exemplary, non-limiting rules for resolution,

1. There is an implicit top level scope.
2. Every block introduces a new scope and labels are defined within a scope.
3. If the same label is defined multiple times within a scope, all definitions are taken together.
4. Absolute or local
   a. References with a leading dot are absolute and bind to all matching labels in the top level scope.
   b. References without a leading dot are local and bind to all matching labels in the innermost scope with a match.
5. Lvalue or rvalue
   a. References with a leading ampersand return the node or nodes to which the reference resolves.
   b. References without a leading ampersand return all successors of all nodes to which the reference resolves.

This algorithm includes an equality relation over labels, which is not required of graphs in general. However, in the textual form, references are identifiers as are all interior nodes (nodes with successors). String equality can thus be used for comparison, although other comparisons are possible, e.g., case insensitive.

In one non-limiting embodiment, it is possible for a reference to attempt to traverse itself during resolution, though this is noted to be an error. Therefore, the expression I {I} has no meaning.

With respect to paths, the operator dot '.' looks up a label within a scope and returns its successor(s). For instance, the following statements are true of any of the Jack and Jill examples:

```
People.Jack.Age == 23
People.Jill.Name == "Jill"
```

In general, paths may resolve to multiple nodes. For example, the path People.Jack resolves to the set of nodes Name, Age, Spouse.

DGraphs also advantageously support factored definitions, such that as a syntactic long hand, the successors of a node need not all be defined together. For instance, consider the following expression.

```
People {
    Jack {Name "Jack", Age 23},
    Jill {Name "Jill", Age 25}
}
```

A definition of an equivalent graph follows:

```
People { Jack { Name = "Jack", Age = 23 } },
People { Jill { Name = "Jill", Age = 25 } }
```

The factoring can be carried even further, as follows:

```
People { Jack { Name = "Jack" } },
People { Jack { Age = 23 } },
People { Jill { Name = "Jill" } },
People { Jill { Age = 25 } }
```

Written next to each other, in the context of a simple set of nodes of a DGraph, the ability to factor definitions in this way may not appear particularly useful. However, advantageously, the factored definitions need not be collocated, e.g., storage can be distributed. Frequently, graph definitions are very large and the ability to spread a definition across many files can be accomplished with factoring definitions.

The equivalence relation between graphs is defined as follows. In the textual representation, every comma separated collection of nodes defines a scope. Within each scope, a label may occur multiple times. In the graph the text represents, all successors of every occurrence of a label are successors of the label. For example, the following expression x{A{ }, B{ }, C{}}, x{D{ }, E{ }, F{ }} represents the same graph as x{A{ }, B{ }, C{ }, D{ }, E{ }, F{ }}

Tracing these steps, the previous example reduces to:

```
People { Jack { Name = "Jack" },
    Jack { Age = 23 },
    Jill { Name = "Jill" },
    Jill { Age = 25 } }
```

Then to:

```
People { Jack { Name = "Jack", Age = 23 },
    Jill { Name = "Jill", Age = 25 } }
```

With DGraphs, an implementation is free to compose these definitions at any time either when the graph is built or when the graph is traversed using path expressions. Factoring gives a system the ability to partition storage as well as partition declarations; however, an observer can interact with the graph as if all definitions are taken together.

This is analogous to bisimulation, which is a binary relation between state transition systems, associating systems, which behave in the same way in the sense that one system simulates the other and vice-versa. Intuitively, two systems are bisimilar if they match one another's moves. In this sense, each of the systems cannot be distinguished from the other by an observer.

With respect to layering and passes, it is noted that a purpose of DGraphs is to construct graphs from strings, which can occur in multiple passes or phases. The basic flow is string to tree to graph, or vice versa, as illustrated in FIG. 1. Within this framework, however, there is still a range of flexibility concerning when to resolve references and when to coalesce the successors of sibling nodes with the same label. The exemplary specification set forth above is designed to allow resolution to occur prior to coalescing, which requires some added complexity to implement; however, this offers greater flexibility in storing graphs and so is worth the implementation effort.

A separate, but related issue is how much interpretation to place over an existing graph viewed as a DGraph. For instance, any arbitrary graph can be viewed as a DGraph. Deferring coalescing to access time allows arbitrary graphs to be viewed as coalesced.

With respect to functional abstraction, as mentioned, DGraphs are a fundamental data representation, like XML or an S-Expression, in that it is desirable to define functional abstraction within the representation. However, this goes beyond standard functional programming languages, like machine language (ML) or Lisp, which deal only with trees.

With respect to explicit references, since written references are resolved as the graph is constructed, optionally, these can be handled differently and treated as a different kind of edge. For instance, in this model, non-reference edges form trees and the references are in a separate class of edge that can cut across the trees as in the "bigraph" model.

A variety of additional examples are presented below in non-limiting fashion to reinforce various aspects of DGraphs set forth herein. As mentioned, the fundamental data abstraction in D is a labeled, directed graph, e.g., as shown by the illustrative example 1400 of FIG. 14.

The graphs consist of labeled nodes and an unordered collection of successors. Labels consist of identifiers, e.g., Name, Jack, People, and literals, e.g., "Jack", 23, 2008-02-29. Graphs with this structure are termed DGraphs herein. Unlike conventional systems, the graphs are not limited to trees and may contain cycles, such as shown by the exemplary directed graph 1500 of FIG. 15.

Successors are unordered. Ordered data is constructed in the normal way with lists of nodes. For example, the list A, B, C, D is represented as:

Within a collection of successors, labels, if present, are unique with nodes being labeled, but not edges. Labels may also be omitted, e.g., compare directed graph representation 1600 of FIG. 16 with directed graph representation 1500 of FIG. 15.

The graph structure can be arbitrary. Representations and type systems impose or recognize structure on these graphs. In exemplary non-limiting fashion, the following description discusses two representations and one type system, though there are many other possible representations and type systems.

In the present embodiment, the textual representation of a DGraph adheres to the following context free grammar.

```
DGraphList:
    DGraph
    DGraphList , DGraph
DGraph:
    Literal
    QualifiedIdentifier
    Label = DGraph
    Label_opt { DGraphList }
Label:
    Identifier TypeAscription_opt
QualifiedIdentifier:
    Identifer
    .
    QualifiedIdentifier . Identifier
```

Figure 14:
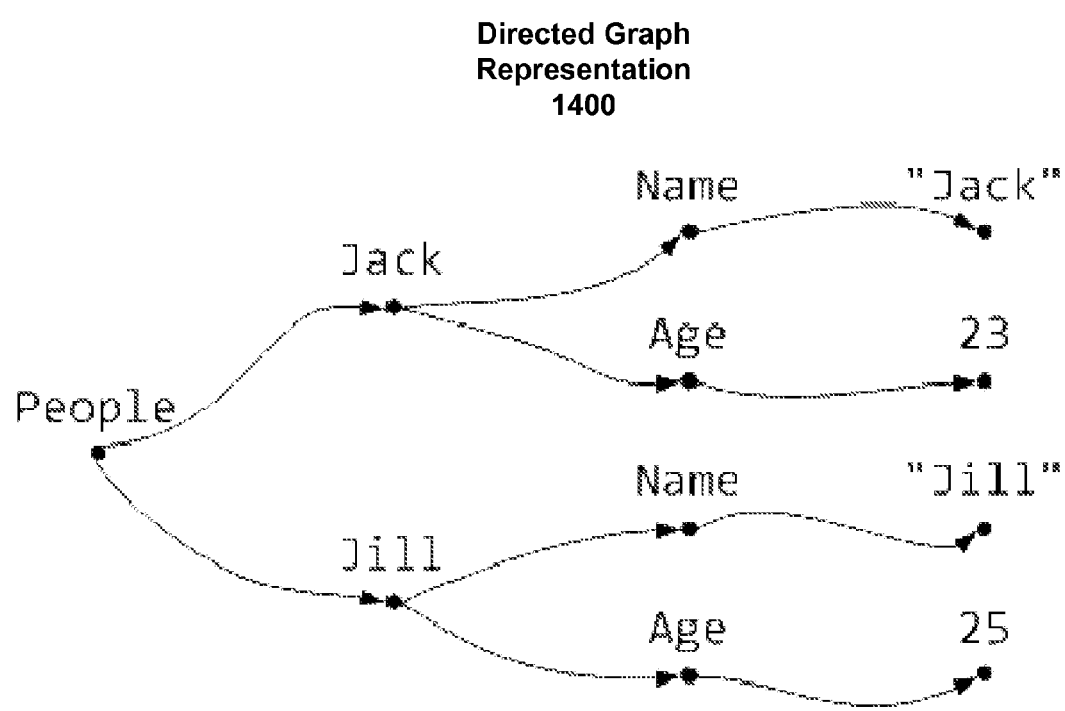
FIGS. 14, 15, 16, 17 and 18 similarly show a sequence of similar or related directed graph structure diagrams to illustrate additional aspects of the compact and flexible syntax for describing graph structures.

For instance, graph 1400 of FIG. 14 may be textually represented as:

```
People {
    Jack { Name { "Jack" }, Age { 23 } },
    Jill { Name { "Jill" }, Age { 25 } }
}
```

There are many possible textual representations for the same canonical DGraph. As a syntactic short cut, equals '=' can be used when a label has only one successor. The following text represents the exact same DGraph as the text above and graph 1400:

```
People {
    Jack { Name = "Jack", Age = 23 },
    Jill { Name = "Jill", Age = 25 }
}
```

As mentioned, labels may be omitted for a compact representation as follows:

```
People {
    { Name = "Jack", Age = 23 },
    { Name = "Jill", Age = 25 }
}
```

Though they can be omitted, labels are still useful. Without them, it is possible to construct only a limited family of tree structured graphs.

As mentioned, DGraphs support factored definitions, i.e., as a syntactic long hand, the successors of a node need not all be defined together and each collection of successors defines a scope. The MemberAccess operator dot '.' looks up a label within a scope and returns its successor(s).

Figure 15:
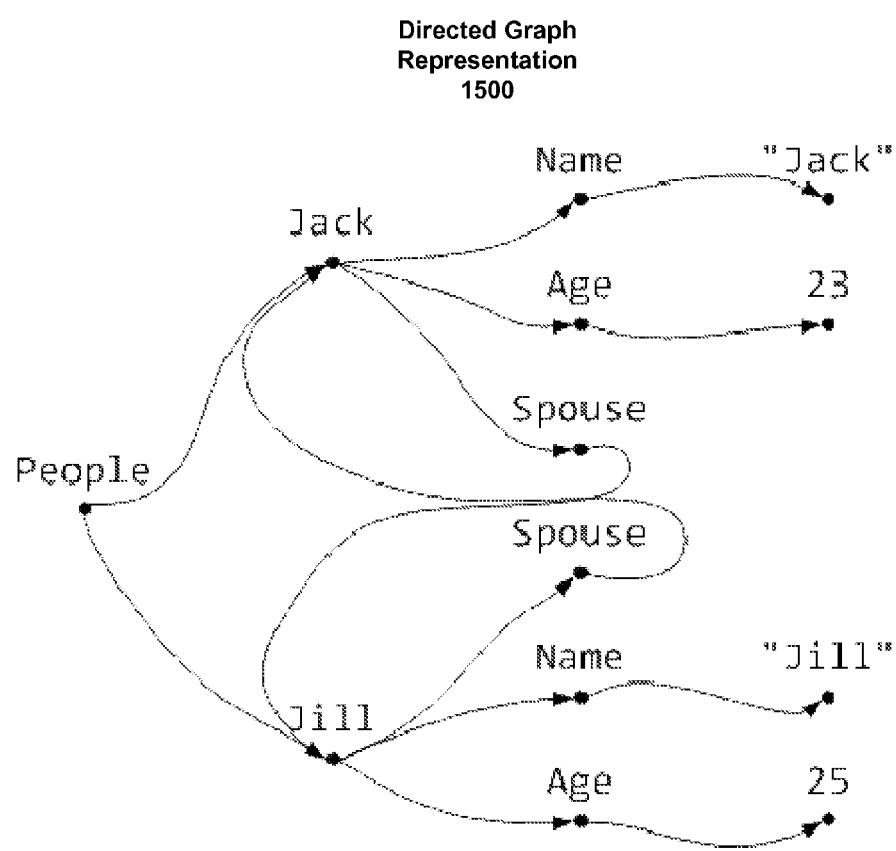
Figure 16:
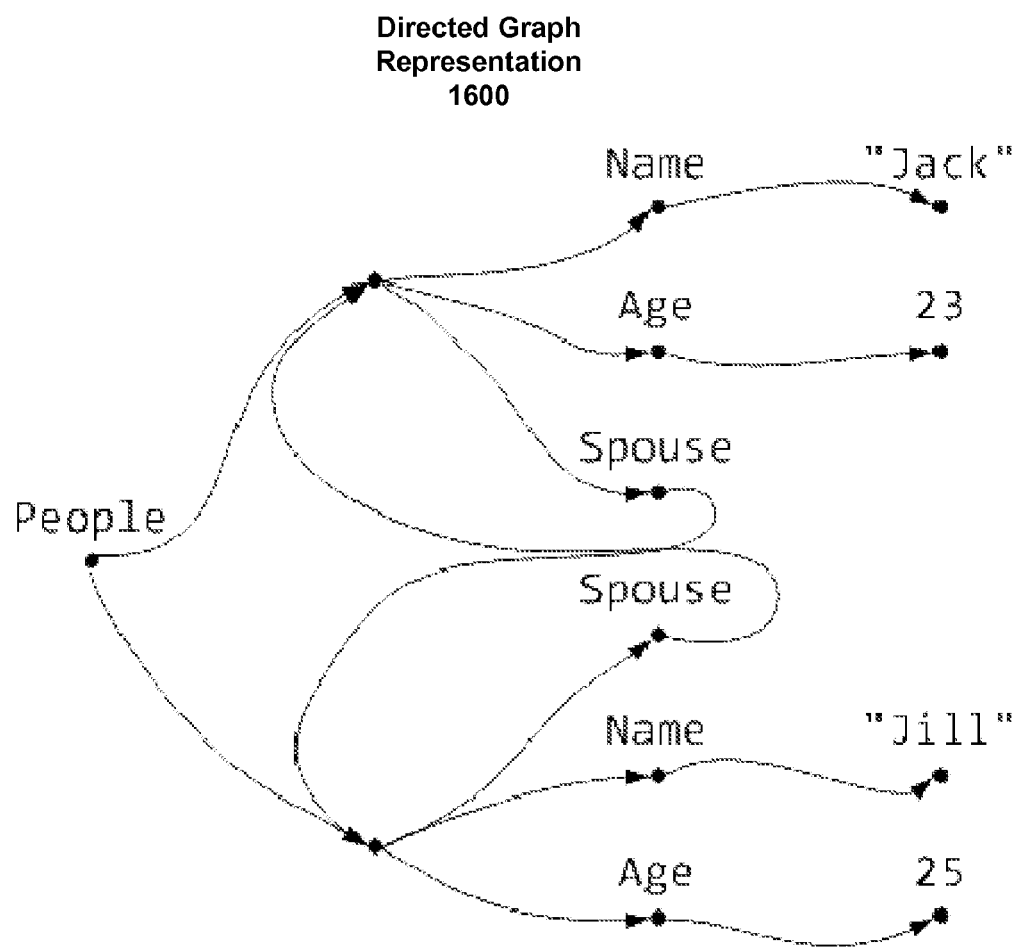

Another use of the scope mechanism is to construct references to other parts of the graph, as in example 1500 of FIG. 15. The following text represents that graph:

```
People {
    Jack { Name = "Jack", Age = 23, Spouse = Jill },
    Jill { Name = "Jill", Age = 25, Spouse = Jack }
}
```

Used as an atomic value (without successors), an identifier is a reference to another node in the graph. The reference is resolved using normal lexical scoping resolution rules proceeding from the innermost to outermost scopes.

In addition, the following example represents the same graph as above and in example 1500:

```
People {
    Jack { Name = "Jack", Age = 23, Spouse = People.Jill },
    Jill { Name = "Jill", Age = 25, Spouse = People.Jack }
}
```

Within the definition of Jack, the resolution procedure first looks for the identifier Jill within the successors of Jack, since there is no matching label, the procedure then looks within the successors of Jack's predecessor People. In this case, there is a label match and it becomes a successor of both Jack.Spouse and People.

As a non-limiting technical detail, it is noted to handle some cases of masking, the member access operator can be used without a left hand operand (e.g., a prefix) to force the lookup to begin from the outermost scope.

For instance, the following represents the same graph as the above two graphs and example 1500:

```
People {
    Jack { Name = "Jack", Age = 23, Spouse = .People.Jill },
    Jill { Name = "Jill", Age = 25, Spouse = .People.Jack }
}
```

A type system recognizes (or imposes) structure in the graph to facilitate interpretation. This section defines one possible type system for DGraphs, though there are many others, and thus details should be considered non-limiting on the overall concepts. Given a simple type system for literals, SimpleType, the following grammar for type declarations pertains:

```
Type:
    SimpleType
    HomogeneousCollection
    Entity
    QualifiedIdentifier
```

For a homogeneous collection, the successors of the homogenous collection must be of the same type, T. The following are examples of homogeneous collections:

```
{1, 2, 3}
{"A", "B", "C"}
People {
    Jack { Name = "Jack", Age = 23 },
    Jill { Name = "Jill", Age = 25 }
}
```

The cardinality of a collection is stipulated with an operator ?, +, * or #m . . . n. A homogeneous collection of 3 to 7 Ts (inclusive) is written T#3 . . . 7. A homogeneous collection of an arbitrary number of Ss is written S* according to the following grammar.

```
HomogeneousCollection:
    Type # LowerBound .. UpperBound
    Type # .. UpperBound
    Type # LowerBound ..
    Type *
    Type +
    Type ?
```

Omitting an integer on the left of a . . . defines the lower bound to be zero. Omitting the integer on the right hand side defines the upper bound to be unbounded. Star '*' defines the bounds to be zero to unbounded. Plus '+' defines the bounds to be one to unbounded. Question '?' defines the bounds to be zero to one.

An entity specifies a required set of labels and the types of their successors. The successor type may differ for each label. The following are instances of entities:

```
Jack { Name = "Jack", Age = 23 }
StarWarsI { Title = "Star Wars: A New Hope", Duration = 121 }
```

An entity is a list of semicolon terminated labels with optional type ascriptions and optional default values. The order of the declarations is not relevant, but all labels are distinct. An entity is specified as follows

```
Entity:
    { ElementList }
ElementList:
    Element
    ElementList Element
Element:
    Identifier TypeAscription_{opt};
    Identifier TypeAscription_{opt} DefaultValue_{opt}
TypeAscription:
    : Type
DefaultValue:
    = DGraph ;
    { DGraphList }
```

An entity with two successors Name and Age, whose successors are of type Text and Number respectively is written:

{Name:Text; Age: Number;}

A type ascription constrains the successors of a node to adhere to the given type. For example, the following is a valid type ascription:

```
People : {Name : Text; Age : Number;}* {
    Jack { Name { "Jack" }, Age { 23 } },
    Jill { Name { "Jill" }, Age { 25 } }
}
```

In contrast, the following is an invalid type ascription:

```
People : {City : Text; Zip : Number;}* {
    Jack { Name = "Jack", Age = 23 },
    Jill { Name = "Jill", Age = 25 }
}
```

As with any definition, the type ascription for a node may be factored, e.g., as follows:

```
People : {City : Text; Zip : Number;}*,
People {
    Jack { Name = "Jack", Age = 23 },
    Jill { Name = "Jill", Age = 25 }
}
```

In D, a type is defined as a collection of values. This collection may be defined implicitly with a type expression built up from HomogeneousCollection and Entity. Alternatively, the successors of any node in the graph define a collection and this too can be used as a type. Consider the following:

People: {City: Text; Zip: Number; Spouse: People;}*

This requires the successor of the Spouse node to be one of the successors of the People node. Therefore, the following is valid:

```
People : {City : Text; Zip : Number; Spouse : People;}*,
People {
    Jack { Name = "Jack", Age = 23, Spouse = Jill },
    Jill { Name = "Jill", Age = 25, Spouse = Jack }
}
```

The successor of People.Jack.Spouse is Jill. Jill is a successor of People, so this satisfies the type.

In addition, the type system can impose an additional level of interpretation over the graph. The compiler uses this interpretation to add implicit edges where needed to satisfy a type constraint. Consider the following example:

```
People : {City : Text; Zip : Number; Spouse : People;}*,
People {
    Jack { Name = "Jack",
        Age = 23,
        Spouse = { Name = "Jill", Age = 25, Spouse = Jack }
    }
}
```

Figure 17:
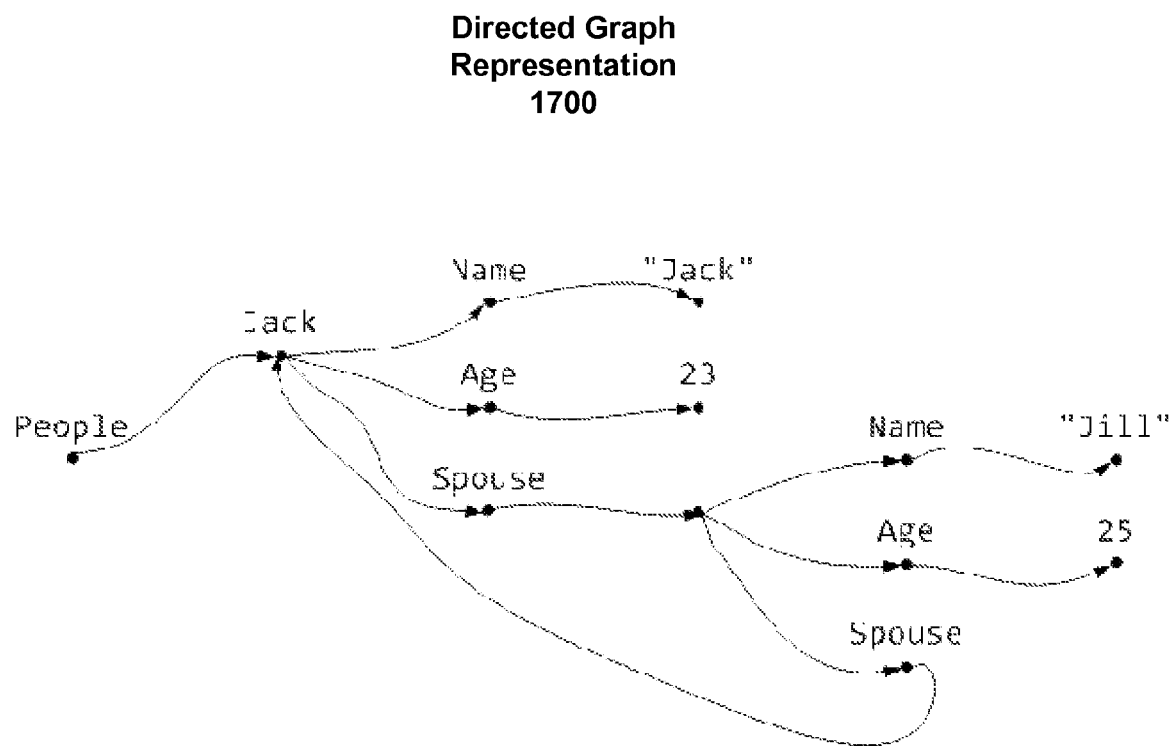

This example is similar to the one above. There is a node People with a successor Jack. Drawing the graph for this declaration yields example 1700 of FIG. 17. Although the layout is different, graph 1700 is almost isomorphic to graph 1500. It has the same number of nodes. It is missing one label Jill, and one edge from People to the node formerly labeled Jill.

As it is, graph 1700 does not adhere to the type ascription on the People node. The missing label is not a problem. Labels on entities are not required. The only issue is the missing edge. In this one special case, the compiler can add an edge because the type ascription requires that the successor of Spouse also be a successor of People.

Figure 18:
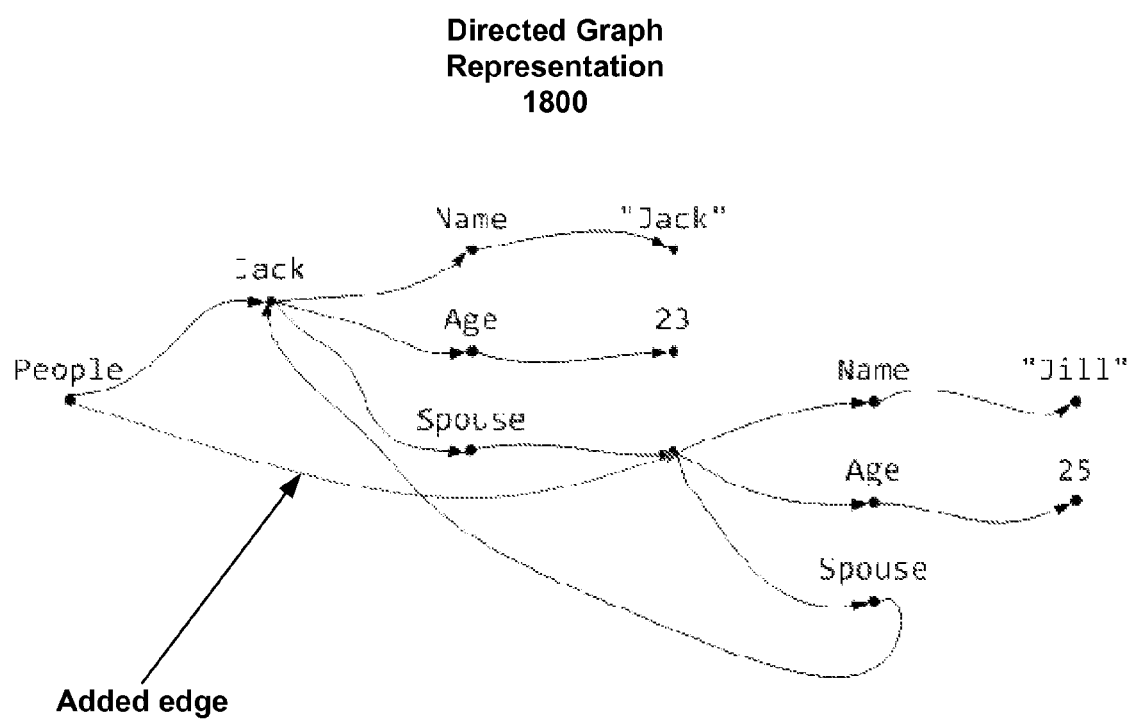

As illustrated by graph 1800 of FIG. 18, this special case facilitates declaring nested graphs in the textual representation, and enables a representation short cut. With the added edge, the two graphs are isomorphic modulo the optional labels on entity values.

Exemplary Declarative Programming Language

For the avoidance of doubt, the additional context provided in this subsection regarding a declarative programming language, such as the D programming language, is to be considered non-exhaustive and non-limiting. The particular example snippets of pseudo-code set forth below are for illustrative and explanatory purposes only, and are not to be considered limiting on the embodiments of the directed graph structures for a declarative programming model described above in various detail.

Figure 19:
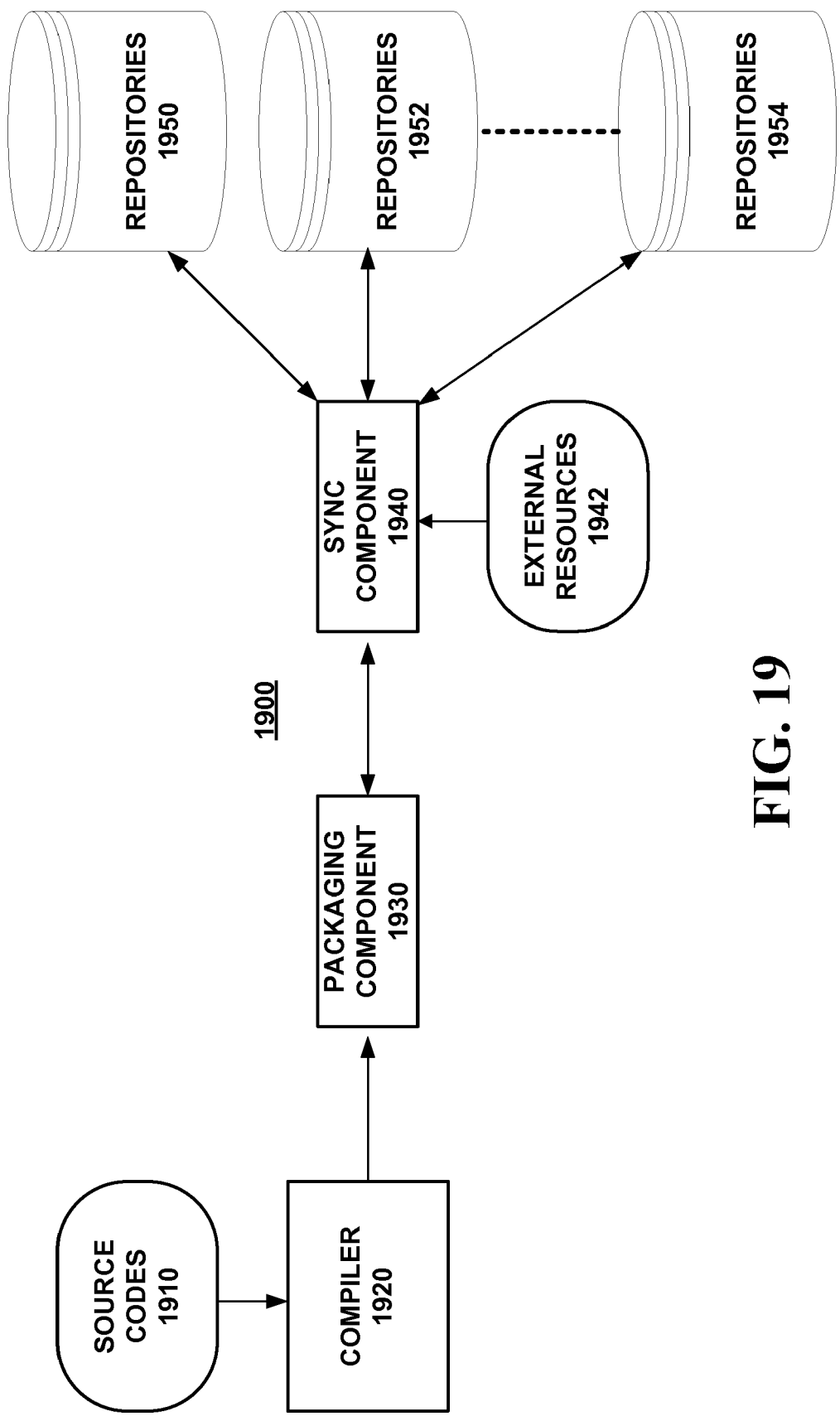
FIG. 19 is an exemplary process chain for a declarative programming model and related representations.
Figure 20:
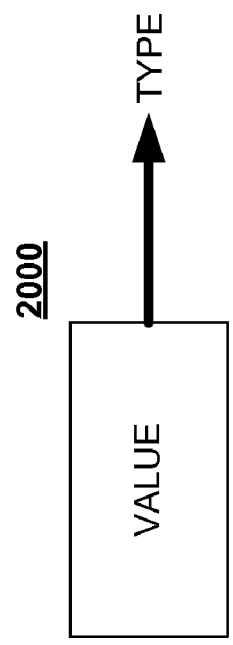
FIG. 20 is an illustration of a type system associated with a record-oriented execution model.
Figure 21:
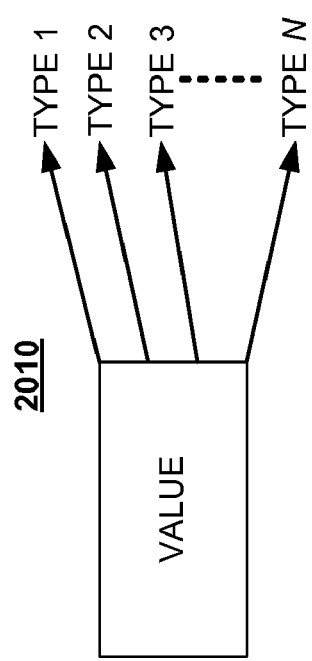
FIG. 21 is a non-limiting illustration of a type system associated with a constraint-based execution model according to an embodiment of the invention.

In FIG. 19, an exemplary process chain for a declarative model is provided, such as a model based on the D programming language. As illustrated, process chain 1900 may include a coupling of compiler 1920, packaging component 1930, synchronization component 1940, and a plurality of repositories 1950, 1952, ..., 1954. Within such embodiment, a source code 1910 input to compiler 1920 represents a declarative execution model authored in a declarative programming language, such as the D programming language. With the D programming language, for instance, the execution model embodied by source code 1910 advantageously follows constraint-based typing, or structural typing, and/or advantageously embodies an order-independent or unordered execution model to simplify the development of code.

Compiler 1920 processes source codes 1910 and can generate a post-processed definition for each source code. Although other systems perform compilation down to an imperative format, the declarative format of the source code, while transformed, is preserved. Packaging component 1930 packages the post-processed definitions as image files, such as D_Image files in the case of the D programming language, which are installable into particular repositories 1950, 1952, ..., 1954. Image files include definitions of necessary metadata and extensible storage to store multiple transformed artifacts together with their declarative source model. For example, packaging component 1930 may set particular metadata properties and store the declarative source definition together with compiler output artifacts as content parts in an image file.

With the D programming language, the packaging format employed by packaging component 1930 is conformable with the ECMA Open Packaging Conventions (OPC) standards. One of ordinary skill would readily appreciate that this standard intrinsically offers features like compression, grouping, signing, and the like. This standard also defines a public programming model (API), which allows an image file to be manipulated via standard programming tools. For example, in the .NET Framework, the API is defined within the "System.IO.Packaging" namespace.

Synchronization component 1940 is a tool that can be used to manage image files. For example, synchronization component 1940 may take an image file as an input and link it with a set of referenced image files. In between or afterwards, there could be several supporting tools (like re-writers, optimizers, etc.) operating over the image file by extracting packaged artifacts, processing them and adding more artifacts in the same image file. These tools may also manipulate some metadata of the image file to change the state of the image file, e.g., digitally signing an image file to ensure its integrity and security.

Next, a deployment utility deploys the image file and an installation tool installs it into a running execution environment within repositories 1950, 1952, . . . , 1954. Once an image file is deployed, it may be subject to various post deployment tasks including export, discovery, servicing, versioning, uninstall and more. With the D programming language, the packaging format offers support for all these operations while still meeting enterprise-level industry requirements like security, extensibility, scalability and performance. In one embodiment, repositories 1950 can be a collection of relational database management systems (RDBMS), however any storage can be accommodated.

In one embodiment, the methods described herein are operable with a programming language having a constraint-based type system. Such a constraint-based system provides functionality not simply available with traditional, nominal type systems. In FIGS. 13-14, a nominally typed execution system is compared to a constraint-based typed execution system according to an embodiment of the invention. As illustrated, the nominal system 1300 assigns a particular type for every value, whereas values in constraint-based system 1310 may conform with any of an infinite number of types.

For an illustration of the contrast between a nominally-typed execution model and a constraint-based typed model according to a declarative programming language described herein, such as the D programming language, exemplary code for type declarations of each model are compared below.

First, with respect to a nominally-typed execution model the following exemplary C# code is illustrative:

```
class A
{
    public string Bar;
    public int Foo;
}
class B
{
    public string Bar;
    public int Foo;
}
```

For this declaration, a rigid type-value relationship exists in which A and B values are considered incomparable even if the values of their fields, Bar and Foo, are identical.

In contrast, with respect to a constraint-based model, the following exemplary D code (discussed in more detail below) is illustrative of how objects can conform to a number of types:

```
type A { Bar : Text; Foo : Integer; }
type B { Bar : Text; Foo : Integer; }
```

For this declaration, the type-value relationship is much more flexible as all values that conform to type A also conform to B, and vice-versa. Moreover, types in a constraint-based model may be layered on top of each other, which provides flexibility that can be useful, e.g., for programming across various RDBMSs. Indeed, because types in a constraint-based model initially include all values in the universe, a particular value is conformable with all types in which the value does not violate a constraint codified in the type's declaration. The set of values conformable with type defined by the declaration type T: Text where value<128 thus includes "all values in the universe" that do not violate the "Integer" constraint or the "value<128" constraint.

Thus, in one embodiment, the programming language of the source code is a purely declarative language that includes a constraint-based type system as described above, such as implemented in the D programming language.

In another embodiment, the method described herein is also operable with a programming language having an order-independent, or unordered, execution model. Similar to the above described constraint-based execution model, such an order-independent execution model provides flexibility that can be useful, e.g., for programming across various RDBMSs.

Figure 22:
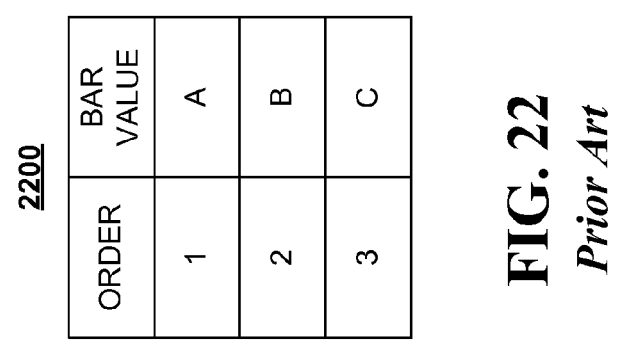
Figure 23:
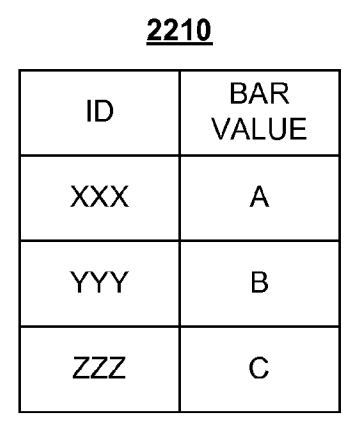

In FIGS. 22-23, for illustrative purposes, a data storage abstraction according to an ordered execution model is compared to a data storage abstraction according to an order-independent execution model. For example, data storage abstraction 2200 of FIG. 22 represents a list Foo created according to an ordered execution model, whereas data abstraction 2210 of FIG. 23 represents a similar list Foo created by an order-independent execution model.

As illustrated, each of data storage abstractions 2200 and 2210 include a set of three Bar values (i.e., "1", "2", and "3"). However, data storage abstraction 2200 requires these Bar values to be entered/listed in a particular order, whereas data storage abstraction 2210 has no such requirement. Instead, data storage abstraction 2210 simply assigns an ID to each Bar value, wherein the order that these Bar values were entered/listed is unobservable to the targeted repository. For instance, data storage abstraction 2210 may have thus resulted from the following order-independent code:

```
f: Foo* = {Bar = "1"};
f: Foo* = {Bar = "2"};
f: Foo* = {Bar = "3"};
```

However, data storage abstraction 2210 may have also resulted from the following code:

```
f: Foo* = {Bar = "3"};
f: Foo* = {Bar = "1"};
f: Foo* = {Bar = "2"};
```

And each of the two codes above are functionally equivalent to the following code:

f: Foot={{Bar="2"}, {Bar="3"}, {Bar="1"}};

An exemplary declarative language that is compatible with the above described constraint based typing and unordered execution model is the D programming language, sometimes referred to herein as "D" for convenience, which was developed by the assignee of the present invention. However, in addition to D, it is to be understood that other similar declarative programming languages may be used, and that the utility of the invention is not limited to any single programming language, where any one or more of the embodiments of the directed graph structures described above apply. In this regard, some additional context regarding D is provided below.

As mentioned, D is a declarative language for working with data. D lets users determine how they want to structure and query their data using a convenient textual syntax that is both authorable and readable. In one non-limiting aspect, a D program includes of one or more source files, known formally as compilation units, wherein the source file is an ordered sequence of Unicode characters. Source files typically have a one-to-one correspondence with files in a file system, but this correspondence is not required. For maximal portability, it is recommended that files in a file system be encoded with the UTF-8 encoding.

Conceptually speaking, a D program is compiled using four steps: 1) Lexical analysis, which translates a stream of Unicode input characters into a stream of tokens (Lexical analysis evaluates and executes preprocessing directives); 2) Syntactic analysis, which translates the stream of tokens into an abstract syntax tree; 3) Semantic analysis, which resolves all symbols in the abstract syntax tree, type checks the structure and generates a semantic graph; and 4) Code generation, which generates executable instructions from the semantic graph for some target runtime (e.g. SQL, producing an image). Further tools may link images and load them into a runtime.

As a declarative language, D does not mandate how data is stored or accessed, nor does it mandate a specific implementation technology (in contrast to a domain specific language such as XAML). Rather, D was designed to allow users to write down what they want from their data without having to specify how those desires are met against a given technology or platform. That stated, D in no way prohibits implementations from providing rich declarative or imperative support for controlling how D constructs are represented and executed in a given environment, and thus, enables rich development flexibility.

D builds on three basic concepts: values, types, and extents. These three concepts can be defined as follows: 1) a value is data that conforms to the rules of the D language, 2) a type describes a set of values, and 3) an extent provides dynamic storage for values.

In general, D separates the typing of data from the storage/extent of the data. A given type can be used to describe data from multiple extents as well as to describe the results of a calculation. This allows users to start writing down types first and decide where to put or calculate the corresponding values later.

On the topic of determining where to put values, the D language does not specify how an implementation maps a declared extent to an external store such as an RDBMS. However, D was designed to make such implementations possible and is compatible with the relational model.

With respect to data management, D is a functional language that does not have constructs for changing the contents of an extent, however, D anticipates that the contents of an extent can change via external (to D) stimuli and optionally, D can be modified to provide declarative constructs for updating data.

It is often desirable to write down how to categorize values for the purposes of validation or allocation. In D, values are categorized using types, wherein a D type describes a collection of acceptable or conformant values. Moreover, D types are used to constrain which values may appear in a particular context (e.g., an operand, a storage location).

D allows types to be used as collections. For example, the "in" operator can be used to test whether a value conforms to a given type, such as:

---
1 in Number
"Hello, world" in Text
---

It should be noted that the names of built-in types are available directly in the D language. New names for types, however, may also be introduced using type declarations. For example, the type declaration below introduces the type name "My Text" as a synonym for the "Text" simple type:

type [My Text]: Text;

With this type name now available, the following code may be written:

"Hello, world" in [My Text]

While it is useful to introduce custom names for an existing type, it is even more useful to apply a predicate to an underlying type, such as:

type SmallText: Text where value.Count<7;

In this example, the universe of possible "Text" values has been constrained to those in which the value contains less than seven characters. Accordingly, the following statements hold true for this type definition:

---
"Terse" in SmallText
!("Verbose" in SmallText)
---

Type declarations compose:

type TinyText: SmallText where value.Count<6;

However, in this example, this declaration is equivalent to the following:

type TinyText: Text where value.Count<6;

It is noted that the name of the type exists so a D declaration or expression can refer to it. Any number of names can be assigned to the same type (e.g., Text where value.Count<7) and a given value either conforms to all of them or to none of them. For example, consider this example:

---
type A : Number where value < 100;
type B : Number where value < 100;
---

Given these two type definitions, both of the following expressions:

1 in A
1 in B will evaluate to true. If the following third type is introduced:

type C: Number where value>0;

the following can be stated:

1 in C

A general principle of D is that a given value can conform to any number of types. This is a departure from the way many object-based systems work, in which a value is bound to a specific type at initialization-time and is a member of the finite set of subtypes that were specified when the type was defined.

Another type-related operation that bears discussion is the type ascription operator (:). The type ascription operator asserts that a given value conforms to a specific type.

In general, when values in expressions are seen, D has some notion of the expected type of that value based on the declared result type for the operator/function being applied. For example, the result of the logical and operator (&&) is declared to be conformant with type "Logical."

It is occasionally useful (or even required) to apply additional constraints to a given value—typically to use that value in another context that has differing requirements. For example, consider the following type definition:

type SuperPositive: Number where value>5;

Assuming that there is a function named "CalcIt" that is declared to accept a value of type "SuperPositive" as an operand, it is desirable to allow expressions like this in D:

```
                    CalcIt(20)
                    CalcIt(42 + 99)
``` and prohibit expressions like this:

```
                    CalcIt(-1)
                    CalcIt(4)
```

In fact, D does exactly what is wanted for these four examples. This is because these expressions express their operands in terms of built-in operators over constants. All of the information needed to determine the validity of the expressions is readily available the moment the D source text for the expression is encountered at little cost.

However, if the expression draws upon dynamic sources of data and/or user-defined functions, the type ascription operator is used to assert that a value will conform to a given type.

To understand how the type ascription operator works with values, a second function, "GetVowelCount," is assumed that is declared to accept an operand of type "Text" and return a value of type "Number" that indicates the number of vowels in the operand.

Since it is unknown based on the declaration of "GetVowelCount" whether its results will be greater than five or not, the following expression is thus not a legal D expression:

CalcIt(GetVowelCount(someTextVariable))

The expression is not legal because the declared result type (Number) of "GetVowelCount" includes values that do not conform to the declared operand type of "CalcIt" (SuperPositive). This expression can be presumed to have been written in error.

However, this expression can be rewritten to the following (legal) expression using the type ascription operator:

CalcIt((GetVowelCount(someTextVariable): SuperPositive))

By this expression, D is informed that there is enough understanding of the "GetVowelCount" function to know that a value that conforms to the type "SuperPositive" will be obtained. In short, the programmer is telling D that he/she knows what D is doing.

However, if the programmer does not know, e.g., if the programmer misjudged how the "GetVowelCount" function works, a particular evaluation may result in a negative number. Because the "CalcIt" function was declared to only accept values that conform to "SuperPositive," the system will ensure that all values passed to it are greater than five. To ensure this constraint is never violated, the system may inject a dynamic constraint test that has a potential to fail when evaluated. This failure will not occur when the D source text is first processed (as was the case with CalcIt(-1))—rather it will occur when the expression is actually evaluated.

In this regard, D implementations typically attempt to report any constraint violations before the first expression in a D document is evaluated. This is called static enforcement and implementations will manifest this much like a syntax error. However, some constraints can only be enforced against live data and therefore require dynamic enforcement.

In this respect, D make it easy for users to write down their intention and put the burden on the D implementation to "make it work." Optionally, to allow a particular D document to be used in diverse environments, a fully featured D implementation can be configurable to reject D documents that rely on dynamic enforcement for correctness in order to reduce the performance and operational costs of dynamic constraint violations.

For further background regard, D, a type constructor can be defined for specifying collection types. The collection type constructor restricts the type and count of elements a collection may contain. All collection types are restrictions over the intrinsic type "Collection," e.g., all collection values conform to the following expressions:

```
                    { } in Collection
                    { 1, false } in Collection
                    ! ("Hello" in Collection)
```

The last example demonstrates that the collection types do not overlap with the simple types. There is no value that conforms to both a collection type and a simple type.

A collection type constructor specifies both the type of element and the acceptable element count. The element count is typically specified using one of the three operators:

T*—zero or more Ts
T+—one or more Ts
T#m . . . n—between m and n Ts.

The collection type constructors can either use Kleene operators or be written longhand as a constraint over the intrinsic type Collection—that is, the following type declarations describe the same set of collection values:

```
        type SomeNumbers : Number+;
        type TwoToFourNumbers : Number#2..4;
        type ThreeNumbers : Number#3;
        type FourOrMoreNumbers : Number#4..;
```

These types describe the same sets of values as these longhand definitions:

```
        type SomeNumbers : Collection where value.Count >= 1
            && item in Number;
        type TwoToFourNumbers : Collection where value.Count >= 2
            && value.Count <= 4
            && item in Number;
        type ThreeNumbers : Collection where value.Count == 3
            && item in Number;
        type FourOrMoreNumbers : Collection where value.Count >= 4
            && item in Number;
```

Independent of which form is used to declare the types, the following expressions can be stated:

```
        !({ } in TwoToFourNumbers)
        !({ "One", "Two", "Three" } in TwoToFourNumbers)
        { 1, 2, 3 } in TwoToFourNumbers
        { 1, 2, 3 } in ThreeNumbers
        { 1, 2, 3, 4, 5 } in FourOrMoreNumbers
```

The collection type constructors compose with the "where" operator, allowing the following type check to succeed:

{1, 2} in (Number where value <3)* where value.Count % 2=0

It is noted that the inner "where" operator applies to elements of the collection, and the outer "where" operator applies to the collection itself.

Just as collection type constructors can be used to specify what kinds of collections are valid in a given context, the same can be done for entities using entity types.

In this regard, an entity type declares the expected members for a set of entity values. The members of an entity type can be declared either as fields or as calculated values. The value of a field is stored; the value of a calculated value is computed. Entity types are restrictions over the Entity type, which is defined in the D standard library.

The following is a simple entity type:

type MyEntity: Language.Entity;

The type "MyEntity" does not declare any fields. In D, entity types are open in that entity values that conform to the type may contain fields whose names are not declared in the type. Thus, the following type test:

{X=100, Y=200} in MyEntity will evaluate to true, as the "MyEntity" type says nothing about fields named X and Y.

Entity types can contain one or more field declarations. At a minimum, a field declaration states the name of the expected field, e.g.:

type Point {X; Y;}

This type definition describes the set of entities that contain at least fields named X and Y irrespective of the values of those fields, which means that the following type tests evaluate to true:

```
{ X = 100, Y = 200 } in Point
{ X = 100, Y = 200, Z = 300 } in Point // more fields than expected OK
! ({ X = 100 } in Point)      // not enough fields - not OK
{ X = true, Y = "Hello, world" } in Point
```

The last example demonstrates that the "Point" type does not constrain the values of the X and Y fields, i.e., any value is allowed. A new type that constrains the values of X and Y to numeric values is illustrated as follows:

```
type NumericPoint {
    X : Number;
    Y : Number where value > 0;
}
```

It is noted that type ascription syntax is used to assert that the value of the X and Y fields should conform to the type "Number." With this in place, the following expressions evaluate to true:

```
{ X = 100, Y = 200 } in NumericPoint
{ X = 100, Y = 200, Z = 300 } in NumericPoint
! ({ X = true, Y = "Hello, world" } in NumericPoint)
! ({ X = 0, Y = 0 } in NumericPoint)
```

As was seen in the discussion of simple types, the name of the type exists so that D declarations and expressions can refer to it. That is why both of the following type tests succeed:

```
{ X = 100, Y = 200 } in NumericPoint
{ X = 100, Y = 200 } in Point
``` even though the definitions of NumericPoint and Point are independent.

Fields in D are named units of storage that hold values. D allows the developer to initialize the value of a field as part of an entity initializer. However, D does not specify any mechanism for changing the value of a field once it is initialized. In D, it is assumed that any changes to field values happen outside the scope of D.

A field declaration can indicate that there is a default value for the field. Field declarations that have a default value do not require conformant entities to have a corresponding field specified (such field declarations are sometimes called optional fields). For example, with respect to the following type definition:

```
type Point3d {
    X : Number;
    Y : Number;
    Z = -1 : Number; // default value of negative one
}
```

Since the Z field has a default value, the following type test will succeed:

{X=100, Y=200} in Point3d

Moreover, if a type ascription operator is applied to the value as follows:

({X=100, Y=200}: Point3d)

then the Z field can be accessed as follows:

({X=100, Y=200}: Point3d).Z in which case this expression will yield the value −1.

In another non-limiting aspect, if a field declaration does not have a corresponding default value, conformant entities must specify a value for that field. Default values are typically written down using the explicit syntax shown for the Z field of "Point3d." If the type of a field is either nullable or a zero-to-many collection, then there is an implicit default value for the declaring field of null for optional and { } for the collection.

For example, considering the following type:

```
type PointND {
    X : Number;
    Y : Number;
    Z : Number?;      // Z is optional
    BeyondZ : Number*; // BeyondZ is optional too
}
```

Then, again, the following type test will succeed:

{X=100, Y=200} in PointND and ascribing the "PointND" to the value yields these defaults:

```
({ X = 100, Y = 200 } : PointND).Z == null
({ X = 100, Y = 200 } : PointND).BeyondZ == { }
```

The choice of using a zero-to-one collection or nullable type vs. an explicit default value to model optional fields typically comes down to one of style.

Calculated values are named expressions whose values are calculated rather than stored. An example of a type that declares such a calculated value is:

```
type PointPlus {
    X : Number;
    Y : Number;
    // a calculated value
        IsHigh( ) : Logical { Y > 0; }
}
```

Note that unlike field declarations, which end in a semicolon, calculated value declarations end with the expression surrounded by braces.

Like field declarations, a calculated value declaration may omit the type ascription, like this example:

```
type PointPlus {
    X : Number;
    Y : Number;
    // a calculated value with no type ascription
        InMagicQuadrant( ) { IsHigh && X > 0; }
        IsHigh( ) : Logical { Y > 0; }
}
```

In another non-limiting aspect, when no type is explicitly ascribed to a calculated value, D can infer the type automatically based on the declared result type of the underlying expression. In this example, because the logical and operator used in the expression was declared as returning a "Logical," the "InMagicQuadrant" calculated value also is ascribed to yield a "Logical" value.

The two calculated values defined and used above did not require any additional information to calculate their results other than the entity value itself. A calculated value may optionally declare a list of named parameters whose actual values must be specified when using the calculated value in an expression. The following is an example of a calculated value that requires parameters:

```
type PointPlus {
    X : Number;
    Y : Number;
    // a calculated value that requires a parameter
        WithinBounds(radius : Number) : Logical {
            X * X + Y * Y <= radius * radius;
        }
        InMagicQuadrant( ) { IsHigh && X > 0; }
        IsHigh( ) : Logical { Y > 0; }
}
```

To use this calculated value in an expression, one provides values for the two parameters as follows:

({X=100, Y=200}: PointPlus).WithinBounds(50)

When calculating the value of "WithinBounds," D binds the value 50 to the symbol radius, which causes the "WithinBounds" calculated value to evaluate to false.

It is noted with D that both calculated values and default values for fields are part of the type definition, not part of the values that conform to the type. For example, considering these three type definitions:

```
type Point {
    X : Number;
    Y : Number;
}
```

-continued

```
type RichPoint {
    X : Number;
    Y : Number;
    Z = -1 : Number;
    IsHigh( ) : Logical { X < Y; }
}
type WeirdPoint {
    X : Number;
    Y : Number;
    Z = 42 : Number;
    IsHigh( ) : Logical { false; }
}
```

Since RichPoint and WeirdPoint only have two required fields (X and Y), the following can be stated:

```
{ X=1, Y=2 } in RichPoint
{ X=1, Y=2 } in WeirdPoint
```

However, the "IsHigh" calculated value is only available when one of these two types is ascribed to the entity value:

```
({ X=1, Y=2 } : RichPoint).IsHigh == true
({ X=1, Y=2 } : WeirdPoint).IsHigh == false
```

Because the calculated value is purely part of the type and not the value, when the ascription is chained, such as follows:

(({X=1, Y=2}: RichPoint): WeirdPoint).IsHigh=false then, the outer-most ascription determines which function is called.

A similar principle is at play with respect to how default values work. It is again noted the default value is part of the type, not the entity value. Thus, when the following expression is written:

({X=1, Y=2}: RichPoint).Z=−1 the underlying entity value still only contains two field values (1 and 2 for X and Y, respectively). In this regard, where default values differ from calculated values, ascriptions are chained. For example, considering the following expression:

(({X=1, Y=2}: RichPoint): WeirdPoint).Z=−1

Since the "RichPoint" ascription is applied first, the resultant entity has a field named Z having a value of −1; however, there is no storage allocated for the value, i.e., it is part of the type's interpretation of the value. Accordingly, when the "WeirdPoint" ascription is applied, it is applied to the result of the first ascription, which does have a field named Z, so that value is used to specify the value for Z. The default value specified by "WeirdPoint" is thus not needed.

Like all types, a constraint may be applied to an entity type using the "where" operator. Consider the following D type definition:

```
type HighPoint {
    X : Number;
    Y : Number;
} where X < Y;
```

In this example, all values that conform to the type "HighPoint" are guaranteed to have an X value that is less than the Y value. That means that the following expressions:

```
{ X = 100, Y = 200 } in HighPoint
! ({ X = 300, Y = 200 } in HighPoint)
``` both evaluate to true.

Moreover, with respect to the following type definitions:

```
type Point {
    X : Number;
    Y : Number;
}
type Visual {
    Opacity : Number;
}
type VisualPoint {
    DotSize : Number;
} where value in Point && value in Visual;
``` the third type, "VisualPoint," names the set of entity values that have at least the numeric fields X, Y, Opacity, and DotSize.

Since it is a common desire to factor member declarations into smaller pieces that can be composed, D also provides explicit syntax support for factoring. For instance, the "VisualPoint" type definition can be rewritten using that syntax:

```
type VisualPoint : Point, Visual {
    DotSize : Number;
}
```

To be clear, this is shorthand for the long-hand definition above that used a constraint expression. Furthermore, both this shorthand definition and long-hand definition are equivalent to this even longer-hand definition:

```
type VisualPoint = {
    X : Number;
    Y : Number;
    Opacity : Number;
    DotSize : Number;
}
```

Again, the names of the types are just ways to refer to types—the values themselves have no record of the type names used to describe them.

D can also extend LINQ query comprehensions with several features to make authoring simple queries more concise. The keywords, "where" and "select" are available as binary infix operators. Also, indexers are automatically added to strongly typed collections. These features allow common queries to be authored more compactly as illustrated below.

As an example of where as an infix operator, the following query extracts people under 30 from a defined collection of "People":

```
from p in People
where p.Age = 30
select p
```

An equivalent query can be written:
People where value.Age=30

The "where" operator takes a collection on the left and a Boolean expression on the right. The "where" operator introduces a keyword identifier value in to the scope of the Boolean expression that is bound to each member of the collection. The resulting collection contains the members for which the expression is true. Thus, the expression:
Collection where Expression
is equivalent to:

```
from value in Collection
where Expression
select value
```

The D compiler adds indexer members on collections with strongly typed elements. For the collection "People," for instance, the compiler might add indexers for "First(Text)," "Last(Text)," and "Age(Number)."

Accordingly, the statement:
Collection.Field (Expression)
is equivalent to:

```
from value in Collection
where Field == Expression
select value
```

"Select" is also available as an infix operator. With respect to the following simple query:

```
from p in People
select p.First + p.Last
``` the "select" expression is computed over each member of the collection and returns the result. Using the infix "select" the query can be written equivalently as:
People select value.First+value.Last The "select" operator takes a collection on the left and an arbitrary expression on the right. As with "where," "select" introduces the keyword identifier value that ranges over each element in the collection. The "select" operator maps the expression over each element in the collection and returns the result. For another example, the statement:
Collection select Expression
is equivalent to the following:

```
from value in Collection
select Expression
```

A trivial use of the "select" operator is to extract a single field:
People select value.First
The compiler adds accessors to the collection so single fields can be extracted directly as "People.First" and "People.Last."

To write a legal D document, all source text appears in the context of a module definition. A module defines a top-level namespace for any type names that are defined. A module also defines a scope for defining extents that will store actual values, as well as calculated values.

The following is a simple example of a module definition:

```
module Geometry {
    // declare a type
    type Point {
        X : Integer; Y : Integer;
    }
    // declare some extents
    Points : Point*;
    Origin : Point;
    // declare a calculated value
    TotalPointCount { Points.Count + 1; }
}
```

In this example, the module defines one type named "Geometry.Point." This type describes what point values will look like, but does not define any locations where those values can be stored.

This example also includes two module-scoped fields (Points and Origin). Module-scoped field declarations are identical in syntax to those used in entity types. However, fields declared in an entity type simply name the potential for storage once an extent has been determined; in contrast, fields declared at module-scope name actual storage that must be mapped by an implementation in order to load and interpret the module.

In addition, modules can refer to declarations in other modules by using an import directive to name the module containing the referenced declarations. For a declaration to be referenced by other modules, the declaration is explicitly exported using an export directive.

For example, considering the following module:

```
module MyModule {
    import HerModule; // declares HerType
    export MyType1;
    export MyExtent1;
    type MyType1 : Logical*;
    type MyType2 : HerType;
    MyExtent1 : Number*;
    MyExtent2 : HerType;
}
```

It is noted that only "MyType1" and "MyExtent1" are visible to other modules, which makes the following definition of "HerModule" legal:

```
module HerModule {
    import MyModule; // declares MyType1 and MyExtent1
    export HerType;
    type HerType : Text where value.Count < 100;
    type Private : Number where !(value in MyExtent1);
    SomeStorage : MyType1;
}
```

As this example shows, modules may have circular dependencies.

The types of the D language are divided into two main categories: intrinsic types and derived types. An intrinsic type is a type that cannot be defined using D language constructs but rather is defined entirely in the D language specification. An intrinsic type may name at most one intrinsic type as its super-type as part of its specification. Values are an instance of exactly one intrinsic type, and conform to the specification of that one intrinsic type and all of its super types.

A derived type is a type whose definition is constructed in D source text using the type constructors that are provided in the language. A derived type is defined as a constraint over another type, which creates an explicit subtyping relationship. Values conform to any number of derived types simply by virtue of satisfying the derived type's constraint. There is no a priori affiliation between a value and a derived type—rather a given value that conforms to a derived type's constraint may be interpreted as that type at will.

D offers a broad range of options in defining types. Any expression which returns a collection can be declared as a type. The type predicates for entities and collections are expressions and fit this form. A type declaration may explicitly enumerate its members or be composed of other types.

Another distinction is between a structurally typed language, like D, and a nominally typed language. A type in D is a specification for a set of values. Two types are the same if the exact same collection of values conforms to both regardless of the name of the types. It is not required that a type be named to be used. A type expression is allowed wherever a type reference is required. Types in D are simply expressions that return collections.

If every value that conforms to type A also conforms to type B, then A is a subtype of B (and B is a super-type of A). Subtyping is transitive, that is, if A is a subtype of B and B is a subtype of C, then A is a subtype of C (and C is a super-type of A). Subtyping is reflexive, that is, A is a (vacuous) subtype of A (and A is a super-type of A).

Types are considered collections of all values that satisfy the type predicate. For that reason, any operation on a collection can be applied to a type and a type can be manipulated with expressions like any other collection value.

D provides two primary means for values to come into existence: calculated values and stored values (a.k.a. fields). Calculated and stored values may occur with both module and entity declarations and are scoped by their container. A computed value is derived from evaluating an expression that is typically defined as part of D source text. In contrast, a field stores a value and the contents of the field may change over time.

Exemplary Networked and Distributed Environments

One of ordinary skill in the art can appreciate that the various embodiments for directed graph structures for a declarative programming model described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may cooperate to perform one or more aspects of any of the various embodiments of the subject disclosure.

Figure 24:
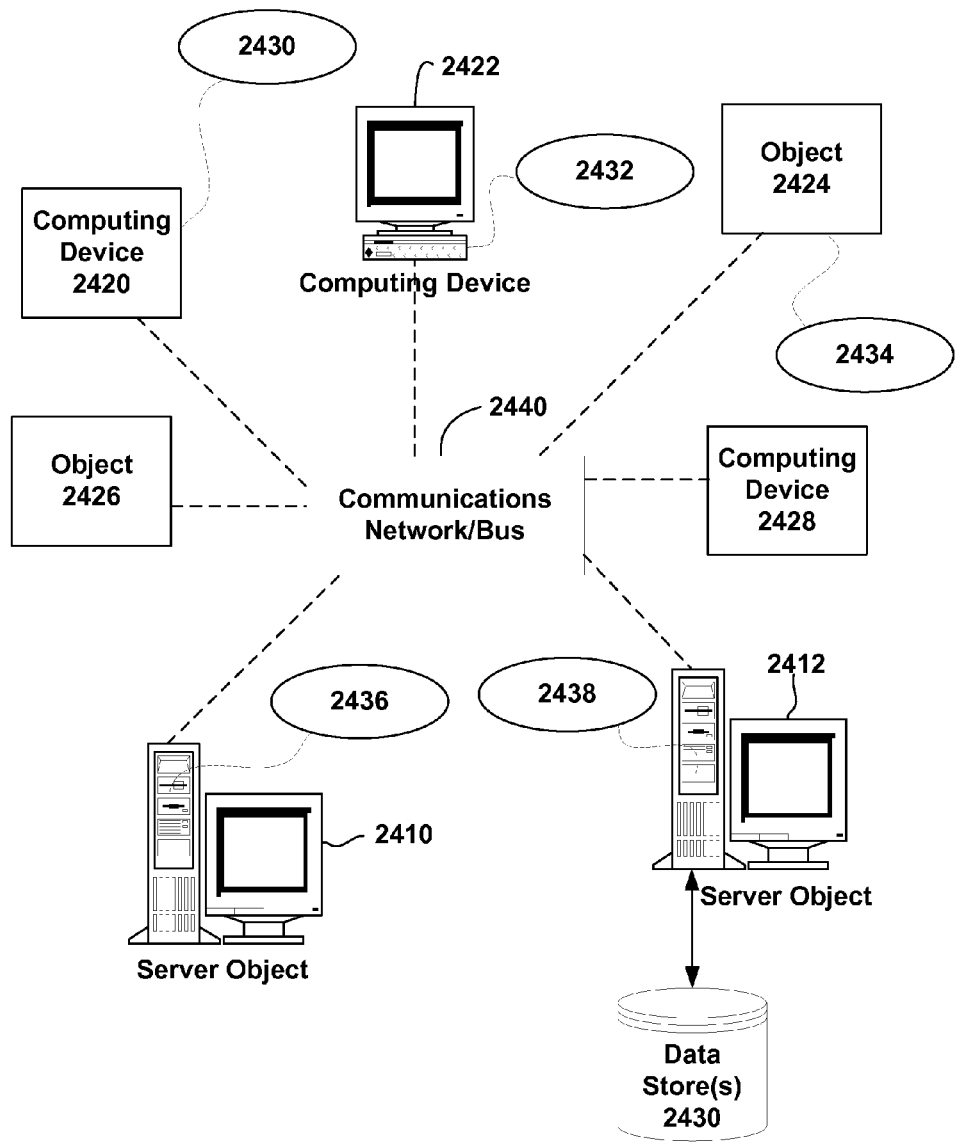
FIG. 24 is a block diagram representing exemplary non-limiting networked environments in which various embodiments described herein can be implemented.

FIG. 24 provides a schematic diagram of an exemplary networked or distributed computing environment. The distributed computing environment comprises computing objects 2410, 2412, etc. and computing objects or devices 2420, 2422, 2424, 2426, 2428, etc., which may include programs, methods, data stores, programmable logic, etc., as represented by applications 2430, 2432, 2434, 2436, 2438. It can be appreciated that objects 2410, 2412, etc. and computing objects or devices 2420, 2422, 2424, 2426, 2428, etc. may comprise different devices, such as PDAs, audio/video devices, mobile phones, MP3 players, personal computers, laptops, etc.

Each object 2410, 2412, etc. and computing objects or devices 2420, 2422, 2424, 2426, 2428, etc. can communicate with one or more other objects 2410, 2412, etc. and computing objects or devices 2420, 2422, 2424, 2426, 2428, etc. by way of the communications network 2440, either directly or indirectly. Even though illustrated as a single element in FIG. 24, network 2440 may comprise other computing objects and computing devices that provide services to the system of FIG. 24, and/or may represent multiple interconnected networks, which are not shown. Each object 2410, 2412, etc. or 2420, 2422, 2424, 2426, 2428, etc. can also contain an application, such as applications 2430, 2432, 2434, 2436, 2438, that might make use of an API, or other object, software, firmware and/or hardware, suitable for communication with, processing for, or implementation of the directed graph structures for a declarative programming model provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the using directed graph structures for a declarative programming model as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 24, as a non-limiting example, computers 2420, 2422, 2424, 2426, 2428, etc. can be thought of as clients and computers 2410, 2412, etc. can be thought of as servers where servers 2410, 2412, etc. provide data services, such as receiving data from client computers 2420, 2422, 2424, 2426, 2428, etc., storing of data, processing of data, transmitting data to client computers 2420, 2422, 2424, 2426, 2428, etc., although any computer can be considered a client, a server, or both, depending on the circumstances. Any of these computing devices may be processing data, encoding data, querying data or requesting services or tasks that may implicate the processing of directed graph structures for a declarative programming model as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the processing of directed graph structures for a declarative programming model can be provided standalone, or distributed across multiple computing devices or objects.

In a network environment in which the communications network/bus 2440 is the Internet, for example, the servers 2410, 2412, etc. can be Web servers with which the clients 2420, 2422, 2424, 2426, 2428, etc. communicate via any of a number of known protocols, such as the hypertext transfer protocol (HTTP). Servers 2410, 2412, etc. may also serve as clients 2420, 2422, 2424, 2426, 2428, etc., as may be characteristic of a distributed computing environment.

Exemplary Computing Device

As mentioned, advantageously, the techniques described herein can be applied to any device where it is desirable to generate data intensive applications which can query large amounts of data quickly. It should be understood, therefore, that handheld, portable and other computing devices and computing objects of all kinds are contemplated for use in connection with the various embodiments, i.e., anywhere that a device may wish to scan or process huge amounts of data for fast and efficient results. Accordingly, the below general purpose remote computer described below in FIG. 25 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 25:
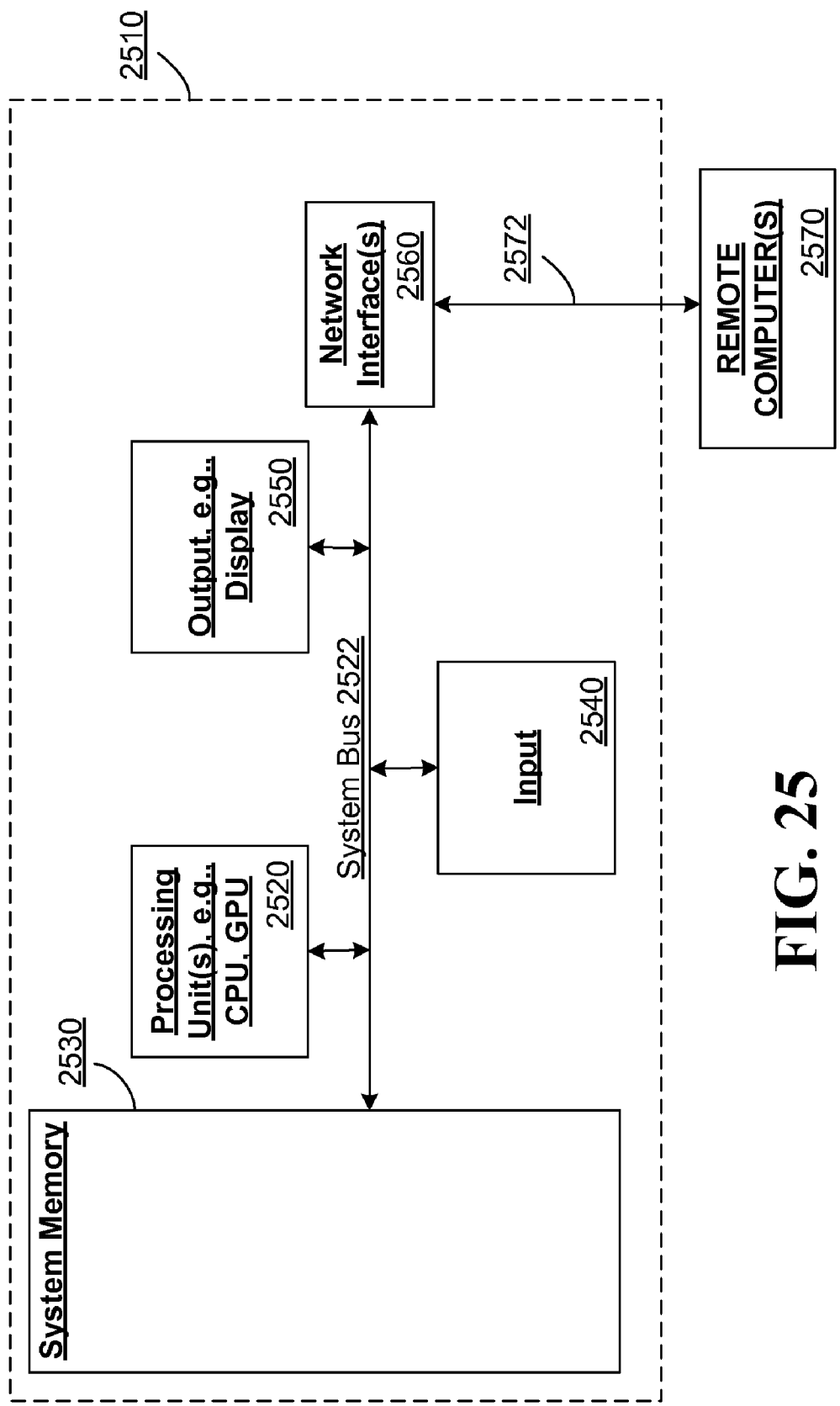
FIG. 25 is a block diagram representing an exemplary non-limiting computing system or operating environment in which one or more aspects of various embodiments described herein can be implemented.

FIG. 25 thus illustrates an example of a suitable computing system environment 2500 in which one or aspects of the embodiments described herein can be implemented, although as made clear above, the computing system environment 2500 is only one example of a suitable computing environment and is not intended to suggest any limitation as to scope of use or functionality. Neither should the computing environment 2500 be interpreted as having any dependency or requirement relating to any one or combination of components illustrated in the exemplary operating environment 2500.

With reference to FIG. 25, an exemplary remote device for implementing one or more embodiments includes a general purpose computing device in the form of a computer 2510. Components of computer 2510 may include, but are not limited to, a processing unit 2520, a system memory 2530, and a system bus 2522 that couples various system components including the system memory to the processing unit 2520.

Computer 2510 typically includes a variety of computer readable media and can be any available media that can be accessed by computer 2510. The system memory 2530 may include computer storage media in the form of volatile and/or nonvolatile memory such as read only memory (ROM) and/or random access memory (RAM). By way of example, and not limitation, memory 2530 may also include an operating system, application programs, other program modules, and program data.

A user can enter commands and information into the computer 2510 through input devices 2540. A monitor or other type of display device is also connected to the system bus 2522 via an interface, such as output interface 2550. In addition to a monitor, computers can also include other peripheral output devices such as speakers and a printer, which may be connected through output interface 2550.

The computer 2510 may operate in a networked or distributed environment using logical connections to one or more other remote computers, such as remote computer 2570. The remote computer 2570 may be a personal computer, a server, a router, a network PC, a peer device or other common network node, or any other remote media consumption or transmission device, and may include any or all of the elements described above relative to the computer 2510. The logical connections depicted in FIG. 25 include a network 2572, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to generate data intensive applications directly in machine and human readable format, e.g., in environments that process queries over large scale data.

Also, there are multiple ways to implement the same or similar functionality, e.g., an appropriate API, tool kit, driver code, operating system, control, standalone or downloadable software object, etc. which enables applications and services to use the directed graph structures for a declarative programming model. Thus, embodiments herein are contemplated from the standpoint of an API (or other software object), as well as from a software or hardware object that provides, generates, processes or stores directed graph structures for a declarative programming model. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A computer executable method for representing programming constructs of a declarative programming language, including:

receiving declarative programming language representations of a first syntax tree data structure and of a second syntax tree structure;

receiving an indication of a selection of a lexical scope resolution alternative from amongst multiple lexical scope resolution alternatives, wherein each of the multiple lexical scope resolution alternatives defines a different way of cross-referencing first syntax tree data structure to the second syntax tree data structure; and generating, by a computing device, a directed graph data structure including at least one cross reference between a node of the first syntax tree data structure, a node of the second syntax tree data structure, and at least two factored definitions, wherein the at least one cross reference is based on the selected lexical resolution alternative; and automatically combining, by the computing device, the at least two factored definitions into a combined definition of the directed graph data structure that is equivalent to the at least two factored definitions.

2. The method of claim 1, wherein the indication of the selection of the lexical scope resolution alternative includes an indication that lexical scope is to be resolved, during the generating of the directed graph data structure, beginning from an upper-level node and progressing to one or more lower-level nodes.

3. The method of claim 1, wherein the indication of the selection of the lexical scope resolution alternative includes an indication that lexical scope is to be resolved, during the generating of the directed graph data structure, beginning from an inner-level node and progressing to one or more outer-level nodes.

4. The method of claim 1, wherein the indication of the selection of the lexical scope resolution alternative includes an indication that lexical scope is to be resolved, during the generating of the directed graph data structure, beginning from a present node.

5. The method of claim 1, wherein the indication of the selection of the lexical scope resolution alternative includes an indication that lexical scope is to be resolved, during the generating of the directed graph data structure, beginning from a successor node of a present node.

6. The method of claim 1, further comprising:
factoring at least one definition of the directed graph data structure into at least two sub-definitions that, together, are equivalent to the at least one definition.

7. The method of claim 6, further comprising:
storing the values of the at least two sub-definitions in at least two different files.

8. The method of claim 1, wherein the indication of the lexical scope resolution alternative includes a '.' that precedes a node label, wherein the '.' indicates that the lexical scope is to be resolved in a top down manner.

9. The method of claim 8, wherein the indication of the lexical scope resolution alternative includes a '&' that precedes a node label, wherein the '&' indicates that the lexical scope is to be resolved beginning from a present node or from a successor node of the present node.

10. The method of claim 1, wherein the indication of the lexical scope resolution alternative includes '&' that precedes a node label, wherein the '&' indicates that the lexical scope is to be resolved beginning from a present node or from a successor node of the present node.

11. A computer-executable method for representing programming constructs of a declarative programming model, including:
receiving a directed graph data structure that is generated through a process that includes selection of a lexical scope resolution alternative from amongst multiple lexical scope resolution alternatives, wherein each of the multiple lexical scope resolution alternatives defines a different way of cross-referencing a first syntax tree data structure to a second syntax tree data structure, and wherein the directed graph data structure includes:

receiving a first definition, wherein the first definition defines the first successor node, wherein the first successor node is a successor of the shared parent node; and separately receiving the second definition, wherein the second definition defines the second successor node, and wherein the second successor node is a successor of the shared parent node; and combining, by a computing device, the first definition and the second definition into a single combined definition, wherein the single combined definition is logically equivalent to a combination of the first definition and the second definition.

12. The method of claim 11, wherein the receiving the directed graph data structure includes generating the directed graph data structure.

13. The method of claim 11, further comprising splitting another definition of the set of definitions into at least two factored definitions that, jointly, are equivalent to the other definition.

14. The method of claim 11, wherein the directed graph data structure further includes labels describing definitions of the set of definitions, and wherein the combining includes performing a top-down join of definitions that share a common label.

15. The method of claim 11, wherein the combining includes performing a top-down conjunction of successors of the common label.

16. The method of claim 13, further comprising storing the at least two factored definitions in at least two different files.

17. A computer readable storage medium, not including a signal per se, comprising computer executable instructions for analyzing directed graph data structures, comprising:
a DGraph module for generating or receiving a directed graph data structure representing a declarative programming model supporting constraint based type definitions and following an order independent execution model, wherein when generating the directed graph data structure, the DGraph module determines a lexical scope resolution alternative, from amongst multiple lexical scope resolution alternatives, that is to be employed in generating the directed graph data structure, wherein each of the multiple lexical scope resolution alternatives defines a different way of cross-referencing a first syntax tree data structure to a second syntax tree data structure, wherein the directed graph data structure includes at least two factored definitions, and wherein the at least two factored definitions are automatically combined into a combined definition of the directed graph data structure that is equivalent to the at least two factored definitions; and a factoring module for identifying at least one definition of the directed graph data structure to which factoring can be applied to form at least one equivalent definition representing the at least one definition.

18. The computer readable medium of claim 17, wherein the factoring module automatically factors the at least one definition to form an equivalent directed graph data structure including the at least one equivalent definition.

19. The computer readable medium of claim 18, further comprising:
an output module for outputting the equivalent directed graph data structure to at least one of storage or a third party application.

* * * * *